US012294468B2

(12) United States Patent
Pouchak et al.

(10) Patent No.: US 12,294,468 B2
(45) Date of Patent: May 6, 2025

(54) BUILDING CONTROLLER WITH MANAGED MULTIPORT SWITCH

(71) Applicant: Honeywell International Inc., Charlotte, NC (US)

(72) Inventors: Michael A. Pouchak, St. Anthony, MN (US); John Hutchey, Henderson, NV (US); Lou Jones, Dayton, NV (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 126 days.

(21) Appl. No.: 17/711,744

(22) Filed: Apr. 1, 2022

(65) Prior Publication Data

US 2022/0329455 A1  Oct. 13, 2022

Related U.S. Application Data

(60) Provisional application No. 63/173,069, filed on Apr. 9, 2021.

(51) Int. Cl.
*H04L 12/28* (2006.01)
*H04L 49/35* (2022.01)

(52) U.S. Cl.
CPC .......... *H04L 12/2807* (2013.01); *H04L 49/35* (2013.01)

(58) Field of Classification Search
CPC . H04L 12/2807; H04L 49/35; H04L 12/2816; H04L 12/4641; H04L 49/20; H04L 49/253

See application file for complete search history.

(56) References Cited

U.S. PATENT DOCUMENTS 4,153,945 A    5/1979   Actor et al.
4,401,412 A    8/1983   Salina et al.
(Continued)

FOREIGN PATENT DOCUMENTS

CN    101354581 B    3/2011
EP    0347703 A1    12/1989
JP    2012523721 A    10/2012

OTHER PUBLICATIONS

"CIPer Model 10 Controller (/CIPer-Controllers/CIPer%E2%84%A2-Model-10-Controller)," Honeywell, 3 pages, 2019.
(Continued)

*Primary Examiner* — Luat Phung
(74) *Attorney, Agent, or Firm* — Seager, Tufte & Wichhem, LLP

(57) ABSTRACT

A building controller is configured to control one or more building system components of a building control system. In one example, the building controller includes a housing and one or more wiring terminals that are accessible from outside of the housing. A controller is housed by the housing and is operatively coupled to the one or more wiring terminals. The controller is configured to output one or more control commands on one or more of the wiring terminals. A managed network switch is housed by the housing and includes a plurality of network switch ports that are each accessible from outside of the housing and are each configured to be releasably secured to one or more network cables. The building controller is configured to receive user input for configuring one or more managed characteristics of the managed network switch.

16 Claims, 23 Drawing Sheets

(56) References Cited

U.S. PATENT DOCUMENTS

| | | | |
|---|---|---|---|
| 4,521,843 A | 6/1985 | Pezzolo et al. | |
| 5,422,550 A * | 6/1995 | McClanahan | H02P 5/50 |
| | | | 60/420 |
| D400,180 S | 10/1998 | Shimizu | |
| 6,227,961 B1 | 5/2001 | Moore et al. | |
| 6,609,070 B1 * | 8/2003 | Lueck | G01N 33/18 |
| | | | 702/50 |
| 7,083,109 B2 | 8/2006 | Pouchak | |
| D578,029 S | 10/2008 | Plewa | |
| D585,838 S | 2/2009 | Tiedemann et al. | |
| D596,963 S | 7/2009 | Novotny et al. | |
| D596,964 S | 7/2009 | Wang et al. | |
| 7,578,135 B2 * | 8/2009 | Mattheis | G05D 23/1902 |
| | | | 236/1 C |
| D607,843 S | 1/2010 | Borax | |
| 7,653,459 B2 | 1/2010 | Pouchak et al. | |
| 7,738,972 B2 | 6/2010 | Pouchak | |
| D620,454 S | 7/2010 | Lissola et al. | |
| D628,199 S | 11/2010 | Yukikado et al. | |
| 7,826,929 B2 | 11/2010 | Wacker | |
| 7,957,839 B2 | 6/2011 | Takach et al. | |
| 8,051,156 B1 | 11/2011 | Sharma et al. | |
| 8,112,162 B2 | 2/2012 | Pouchak et al. | |
| D659,652 S | 5/2012 | Wong | |
| 8,239,500 B2 | 8/2012 | Pouchak | |
| 8,375,402 B2 | 2/2013 | Majewski et al. | |
| D678,084 S | 3/2013 | Beland et al. | |
| 8,418,128 B2 | 4/2013 | Pouchak et al. | |
| 8,532,797 B2 | 9/2013 | Gutha et al. | |
| 8,549,422 B2 | 10/2013 | Gutha et al. | |
| 8,640,120 B2 | 1/2014 | Gutha et al. | |
| 8,650,306 B2 | 2/2014 | Pouchak | |
| D705,223 S | 5/2014 | Akana et al. | |
| 8,738,793 B2 | 5/2014 | Gutha et al. | |
| 8,793,668 B2 | 7/2014 | Gutha et al. | |
| D720,633 S | 1/2015 | Novotny et al. | |
| 8,954,543 B2 | 2/2015 | Pouchak | |
| 8,983,632 B2 | 3/2015 | Wacker et al. | |
| D735,667 S | 8/2015 | Mielnik et al. | |
| 9,213,342 B2 * | 12/2015 | Drake | F24F 11/52 |
| D758,365 S | 6/2016 | Shimano et al. | |
| D762,842 S | 8/2016 | Kokeny et al. | |
| D765,031 S | 8/2016 | Mielnik et al. | |
| D768,585 S | 10/2016 | Moore et al. | |
| D774,005 S | 12/2016 | Ye et al. | |
| D792,353 S | 7/2017 | Yoshida et al. | |
| D793,967 S | 8/2017 | Leeland et al. | |
| 9,726,392 B2 | 8/2017 | Wacker | |
| 9,763,303 B2 | 9/2017 | Steiner | |
| D815,606 S | 4/2018 | Nada et al. | |
| D828,816 S | 9/2018 | Spors et al. | |
| D836,092 S | 12/2018 | Erbacher et al. | |
| 10,200,203 B2 | 2/2019 | Jones et al. | |
| 10,240,593 B2 | 3/2019 | Stephens | |
| D865,731 S | 11/2019 | Sun et al. | |
| D873,269 S | 1/2020 | Hu et al. | |
| 10,659,289 B2 | 5/2020 | Shif et al. | |
| 10,667,425 B1 * | 5/2020 | Gardner | H05K 7/1492 |
| 10,753,630 B2 | 8/2020 | Rupp et al. | |
| 11,108,649 B2 | 8/2021 | Pouchak et al. | |
| 11,162,702 B2 | 11/2021 | Blair et al. | |
| 11,237,528 B2 | 2/2022 | Gerszewski et al. | |
| 2002/0152298 A1 | 10/2002 | Kikta et al. | |
| 2003/0107495 A1 | 6/2003 | Swieboda et al. | |
| 2003/0231550 A1 | 12/2003 | Macfarlane | |
| 2004/0168094 A1 | 8/2004 | Chen et al. | |
| 2008/0030971 A1 * | 2/2008 | Miller | G06F 1/266 |
| | | | 713/153 |
| 2008/0222432 A1 | 9/2008 | Gilbert | |
| 2009/0113037 A1 | 4/2009 | Pouchak | |
| 2009/0271001 A1 | 10/2009 | Westphal et al. | |
| 2010/0138054 A1 | 6/2010 | Goupil | |
| 2010/0251266 A1 * | 9/2010 | Majewski | G06F 9/542 |
| | | | 719/323 |
| 2010/0277270 A1 | 11/2010 | Aikens et al. | |
| 2011/0160878 A1 | 6/2011 | Gutha et al. | |
| 2011/0160879 A1 | 6/2011 | Gutha et al. | |
| 2013/0211611 A1 * | 8/2013 | Ahrensbach | F03D 7/048 |
| | | | 700/287 |
| 2013/0241456 A1 | 9/2013 | Perra et al. | |
| 2014/0179165 A1 * | 6/2014 | Afra | H01R 13/665 |
| | | | 439/620.21 |
| 2014/0226286 A1 * | 8/2014 | Novotny | G05D 23/1902 |
| | | | 361/747 |
| 2014/0254477 A1 * | 9/2014 | Fricke | H04W 12/04 |
| | | | 370/328 |
| 2014/0368956 A1 | 12/2014 | Perra et al. | |
| 2015/0212714 A1 | 7/2015 | Hua et al. | |
| 2016/0091903 A1 | 3/2016 | Patton et al. | |
| 2017/0234558 A1 * | 8/2017 | Gerszewski | F24F 11/64 |
| | | | 700/276 |
| 2017/0315522 A1 | 11/2017 | Kwon et al. | |
| 2018/0199439 A1 | 7/2018 | Kreuter | |
| 2019/0245706 A1 | 8/2019 | Jones et al. | |
| 2020/0162503 A1 | 5/2020 | Shurtleff et al. | |
| 2020/0177485 A1 | 6/2020 | Shurtleff et al. | |
| 2020/0386432 A1 | 12/2020 | Ferraro et al. | |
| 2020/0386436 A1 | 12/2020 | Pouchak et al. | |
| 2020/0387130 A1 | 12/2020 | Ferraro et al. | |
| 2021/0293429 A1 * | 9/2021 | Wang | F24F 11/30 |
| 2022/0021667 A1 | 1/2022 | Wellig et al. | |

OTHER PUBLICATIONS

"CIPer Model 30 HVAC Controller: Scalable, Fast and Flexible" Honeywell, 2 pages, May 2019.

"CIPer Controllers With Niagara 4 Framework," Honeywell, 3 pages, Apr. 2019.

"DVC-V304," Delta Controls, 3 pages, 2019.

"Technical Document: Niagara AX-3.X Browser Access Guide," Niagra Framework, 84 pages, May 30, 2007.

"SPYDER: PUL-, PVL-, PUB-, PVB- Controllers," Honeywell, 422 pages, Mar. 2015.

Alexander, "Clear Up Your HOA Confusion," Efficient Plant, 7 pages, 2016.

"H-O-A Operation," CORSAIR, 3 pages, Mar. 12, 2006.

John, "Hand off Auto Switch Operation," Electrical Engineering Instrumentation, 3 pages, Jun. 2018.

"MR-600 Series: Manual Override Relays," Air Products And Controls, 2 pages, 2005.

"Fire Pump Controllers," Jockey Pump Controllers, 53 pages, Jun. 2015.

EP20179389, European Search Report, pp. 8, Oct. 23, 2020.

"Building Controller-Google Search," Google, 34 pages, accessed Dec. 28, 2018.

"Building Controller Honeywell—Google Search," Google, 34 pages, accessed Dec. 28, 2018.

"Advantech Introduces New Direct Digital Controller with Integrated BACNet Router-BAS-3500BC," Advantech, 1 page, Dec. 2012.

"Advantech Launches Full-Featured Building Automation Controller Series," Design World Staff, 9 pages, Jan. 28, 2009.

"SAUTER Modulo System Description," SAUTER, 100 pages, date accessed Jun. 27, 2019.

U.S. Appl. No. 29/662,117, "Building Controller," filed Sep. 1, 2018.

U.S. Appl. No. 29/662,118, "User Interface Module and Mounting Base For A Building Control System," filed Sep. 1, 2018.

"AQ2000 Series: Installation Instructions," Honeywell, 4 pages, Sep. 28, 2010.

"The Wildest Web Is Built On WEBs-AX," Honeywell, 8 pages, Sep. 2013.

"QCA-336 Application Controllers," Quest Controls, 5 pages, 2019.

"SYNCO—Simple and Energy-Efficient HVAC Control," SIEMENS, 12 pages, 2013.

"WEB-8000 Series Controller," Honeywell, 2 pages, May 2015.

U.S. Appl. No. 16/436,859, filed Jun. 10, 2019.

(56) References Cited

OTHER PUBLICATIONS

European Search Report for Application No. 20179390.8-1218 mailed Oct. 28, 2020.
"CIPer Model 30 Controller, System Engineering User Guide," Honeywell, 416 pages, Mar. 2021.

* cited by examiner

| Nav | | Property Sheet 94b | |
|---|---|---|---|
| My Network ▽ | | -Fault Cause | Configuration Loaded from the File Succ |
| -MyHost:1E3BLTGXNP5S2.global.ds.hon | | | |
| -10.78.2.84(IPStation) | | -Note | Changes will be written to platform only after performing "Apply RSTP Settings" action on RstpConfiguration component (LocalDevice->Rstp Configuration). |
| -Platform | | | |
| -Station(IPStation) | | | |
| -Alarm | | | |
| -Config | | -Enabled | False ▽ |
| -Services | | -Reboot After Save | False ▽ |
| -Drivers | | -Bridge Priority | 49152 ▽ |
| -NiagaraNetwork | | -Port Priority0 | 128 ▽ |
| -IPCNetwork | | -Port Priority1 | 128 ▽ |
| -LocalDevice | | -Port Priority2 | 128 ▽ |
| -Alarm Source Info | | -Port Priority3 | 128 |
| -Switch Port Configuration | | -Hello Time | 3    s(1-10) |
| -Points | | -Forward Delay Time | 15   s(4-30) |
| -Apps | | -Maximum Aging Time | 20   s(6-40) |
| -Files | | -Rstp Port Role And Status RSTP Port Role And Status Component | |
| -Hierarchy | | -Bridge Id | F0:54:94:00:46:CF |
| -History | | -Rood Bridge Id | F0:54:94:00:46:CF |
| Palette | | -Port1 Role | Designated |
| ipcProgrammingTool | | Refresh  Save | |

94a → My Network 94 (property sheet area)

FIG. 16

BUILDING CONTROLLER WITH MANAGED MULTIPORT SWITCH

RELATED APPLICATIONS

This application claims the benefit of U.S. Provisional Application No. 63/173,069, filed Apr. 9, 2021, which application is hereby incorporated by reference in its entirety.

TECHNICAL FIELD

The present disclosure pertains generally to building control systems and more particularly to building controllers that accommodate and/or facilitate control of a building's environment.

BACKGROUND

Building control systems are often used to help control a building's environment, such as temperature, humidity, air quality, lighting, security and/or other aspects of a building's environment. An example building control system may include a Heating, Ventilation, and/or Air Conditioning (HVAC) system used to control the comfort level within a building. Such HVAC systems typically includes one or more HVAC controllers that control various HVAC components of the HVAC system in order to affect and/or control one or more environmental conditions within the building. Alternatively, or in addition, a building control system may include a lighting control system that includes one or more lighting controllers that control various lighting components of the building. Alternatively, or in addition, a building control system may include a security system that includes one or more security controllers that control various security components of the building. These are just examples. A need remains for improved building controllers.

SUMMARY

This disclosure relates generally to building controllers such as HVAC controllers, lighting controller and/or security controllers. An example of the disclosure includes a building controller that is configured to control one or more building system components of a building control system. The illustrative building controller includes a housing and one or more wiring terminals that are accessible from outside of the housing. In some cases, the wiring terminals are configured to receive one or more wires from corresponding building system components. A controller is housed by the housing and is operatively coupled to the one or more wiring terminals. The controller is configured to output one or more control commands on one or more of the wiring terminals (e.g. and thus to one or more of the building system components), wherein at least one of the one or more control commands is configured to control one or more building control components. A managed network switch is also housed by the housing and includes a plurality of network switch ports that are each accessible from outside of the housing and are each configured to be releasably secured to one or more network cables. The building controller is configured to receive user input for configuring one or more managed characteristics of the managed network switch.

Another example of the disclosure includes a Heating, Ventilating and Air Conditioning (HVAC) controller that is configured to control operation of at least part of an HVAC system. The illustrative HVAC controller includes a housing that is configured to be secured to a mounting surface. A managed multi-port network switch that includes a plurality of network ports is secured relative to the housing. A controller is disposed within the housing. The controller outputs one or more control commands to control operation of at least part of the HVAC system, and is also operably coupled with the managed multi-port network switch.

Another example of the disclosure includes a building controller that is configured to control one or more components of a building control system. The illustrative building controller includes a housing and a controller that is housed by the housing. The controller is configured to output one or more control commands in order to control one or more building control components. A managed network switch is housing by the housing and includes a plurality of network switch ports that are each accessible from outside of the housing and are each configured to be releasably secured to one or more network cables. The building controller is configured to receive user input for configuring one or more managed characteristics of the managed network switch.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 7 through 16 are illustrative screen shots for configuring one or more managed characteristics of the managed network switch;

Figure 1:
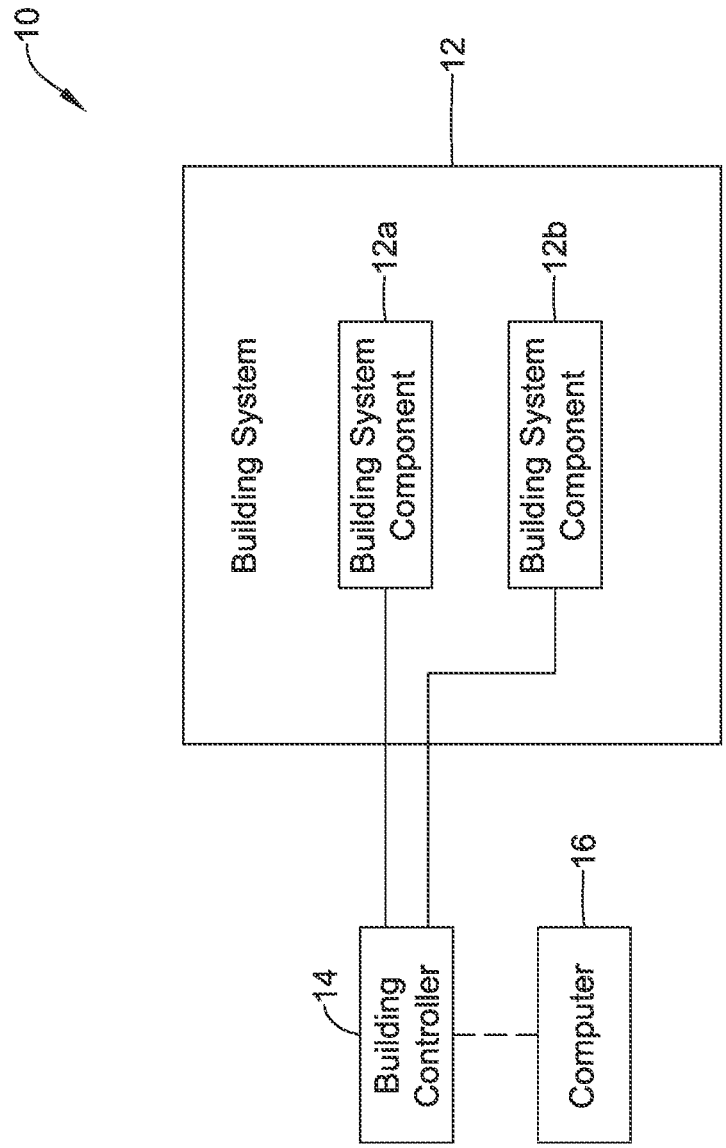
FIG. 1 is a schematic block diagram of an illustrative building control system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building control system 10. The building control system 10 includes a building system 12 and a building controller 14 that is configured to control operation of at least part of the building system 12. The building system 12 is shown as including a building system component 12a and a building system component 12b. It will be appreciated that this is merely illustrative, as the building system 12 may have any number of distinct building system components, and likely has a large number of distinct building system components. The building system 12 may represent any number of different building systems or combination of building systems, such as but not limited to HVAC systems, lighting systems, security systems and/or any other suitable building system. For purposes of illustration, the building system 12 will be described herein with respect to an HVAC system, but the disclosure is not intended to be so limiting.

In some cases, the building control system 10 may include a computer 16. The computer 16 may be a desktop computer, a laptop computer, a tablet computer, a mobile phone or any other suitable computing device. The computer 16 may be disposed adjacent the building controller 14 for purposes of programming the building controller 14. In some instances, the computer 16 may be remotely located, or may represent a cloud-based server that is capable of communicating with the building controller 14. In some cases, the computer 16 may implement a programming desktop such as a function block wire sheet, in which function blocks may be dragged and dropped onto a wire screen, and the user may subsequently easily connect various inputs and outputs of the function blocks to program desired functions of the building controller 14. The software may translate the function blocks and related inputs and outputs for use by the building controller 14 in controlling operation of the building system 12. In some cases, the building controller 14 may execute a function block engine that is capable of executing code translated from the function block engine wire sheet. One such programming environment is implemented in the Niagara Framework™, available from Tridium Inc. of Richmond, Virginia.

Figure 2:
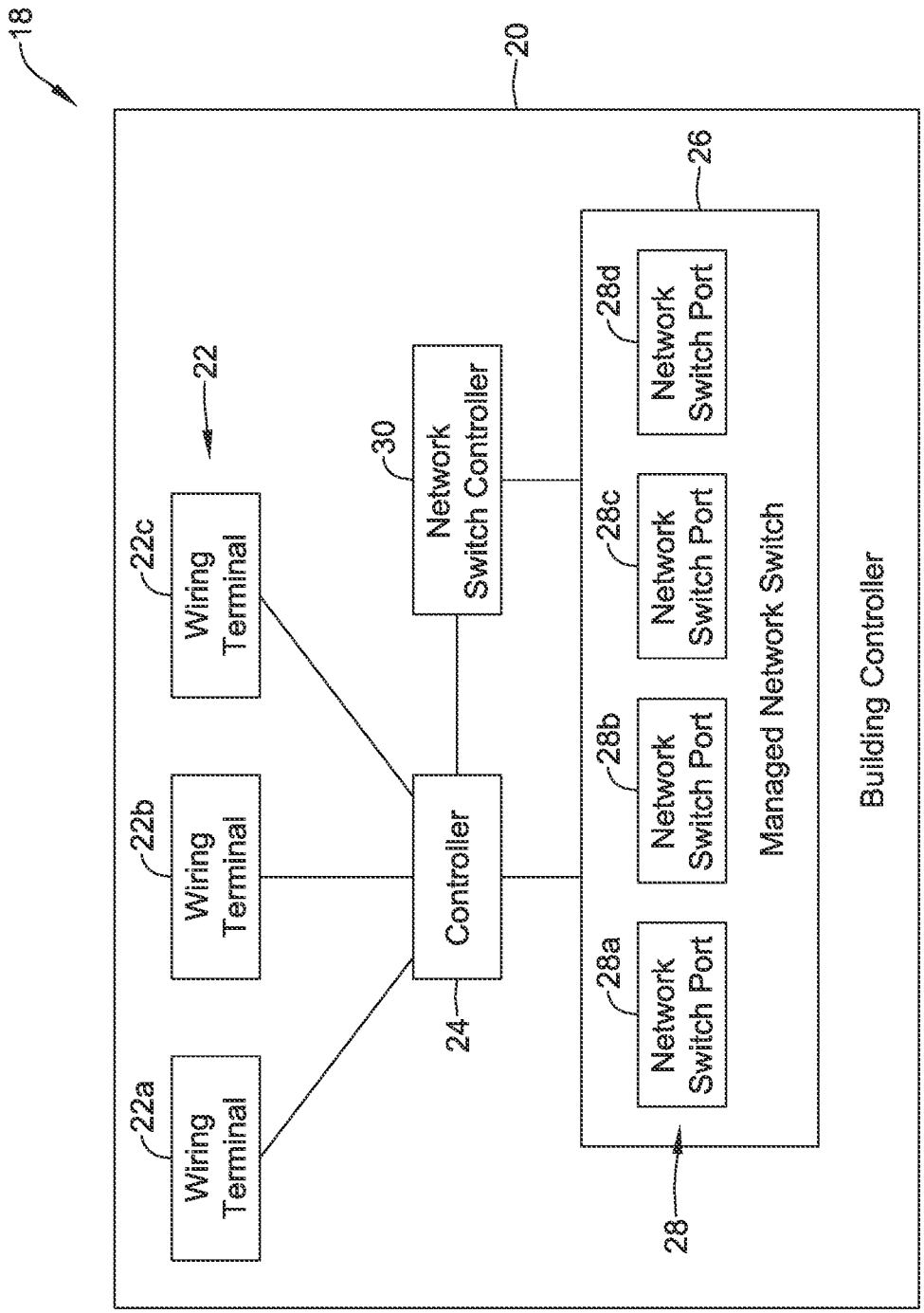
FIG. 2 is a schematic block diagram of an illustrative building controller usable with the illustrative building system of FIG. 1.

FIG. 2 is a schematic block diagram of an illustrative building controller 18 that may be considered as being an example of the building controller 14 shown in FIG. 1. The building controller 18 is configured to control one or more building system components 12a,12b of a building system such as the building system 12. The illustrative building controller 18 includes a housing 20 and one or more wiring terminals 22 that are accessible from outside of the housing 20 such that a user can secure one or more wires (e.g. from one or more building system components 12a,12b of a building system 12) to each of the one or more wiring terminals 22. The wiring terminals 22 are individually labeled as 22a, 22b and 22c. While a total of three wiring terminals 22 are illustrated, it will be appreciated that the building controller 18 may include any number of wiring terminals 22. The wiring terminals 22 may be considered as including input terminals through which the building controller 18 may receive signals from remotely located components as well as output terminals through which the building controller 18 may output control signals and other signals to remotely located building system components 12a,12b of the building system 12.

The illustrative building controller 18 includes a controller 24 that is housed by the housing 20 and that is operably coupled to the one or more wiring terminals 22. The controller 24 may execute a control algorithm that outputs one or more control commands on one or more of the wiring terminals 22. At least some of these control commands may be configured to control one or more building system components 12a, 12b. The illustrative building controller 18 also includes a managed network switch 26 that is housed by the housing 20. In some cases, the controller 24 and the managed network switch 26 may be distinct components. In some cases, the controller 24 and the managed network switch 26 may be disposed on a common circuit board, for example. In some instances, the controller 24 and the managed network switch 26 may be integrated together insomuch as the controller 24 and the managed network switch 26 share a common power supply, a common memory and/or a common processor. In some cases, the control algorithm executed by the controller 24 may be dependent on diagnostic and/or other information received from the managed network switch 26.

The managed network switch 26 includes a plurality of network switch ports 28 that are each accessible from outside of the housing 20 and that are configured to be releasably secured to one or more network cables (not shown). The plurality of network switch ports 28 are individually labeled as 28a, 28b, 28c, 28d. While a total of four network switch ports 28 are shown, in some cases the managed network switch 26 may include only one, two or three network switch ports 28. The managed network switch 26 may in some cases include five, six or more network switch ports 28. In some instances, at least some of the network switch ports 28 may be configured to operate at 10 megabits per second (Mb/s), at 100 Mb/s, 1000 Mb/s or more. The building controller 18 may be configured to receive user input for configuring one or more managed characteristics of the managed network switch 26, as will be explained.

In some cases, the controller 24 may be configured to control at least part of the managed network switch 26, in addition to controlling operation of one or more building system components. In some cases, the building controller 18 may include a network switch controller 30 that is distinct from the controller 24. The network switch controller 30 may be configured for controlling at least part of the managed network switch 26. The controller 24 and the network switch controller 30 may communicate with each other.

In some instances, the building controller 18 may be configured to perform diagnostics on one or more of the plurality of network switch ports 28, resulting in diagnostic information. As an example, the diagnostic information may include one or more identified faults in one or more network cables that are secured to one or more of the plurality of network switch ports 28. The diagnostic information may indicate, for example, that a particular cable has a physical disruption or break at a particular physical location within the cable. The break may be identified as occurring "32 meters downstream" of the building controller 18, or perhaps "14 meters upstream" of the building controller 18. These are just examples. The controller 24 may be configured to execute a control algorithm in order to generate the one or more control commands, and in some instances, the control algorithm may be at least partially dependent on the diagnostic information. For example, if a particular network switch port 28 that receives particular sensor information is found to be "offline", the control algorithm may control one or more of the building system components 12a,12b differently to avoid relying on the missing sensor information.

In some instances, the controller 24 may be configured to accept information that is received by one or more of the plurality of network switch ports 28. For example, and in some instances, the controller 24 may be configured to accept user input from one or more of the plurality of network switch ports 28 for configuring one or more managed characteristics of the managed network switch 26. The one or more managed characteristics of the managed network switch 26 may include, for example, a Media Access Control (MAC) filtering characteristic that allows filtering by specific MAC address. The one or more managed characteristics of the managed network switch 26 may include activation and/or deactivation of one or more of the plurality of network switch ports 28 of the managed network switch 26. This allows for deactivation of network switch ports 28 that are not being used, as well as activating network switch ports 28 that are newly being used. This may help improve the security of the building control system.

The one or more managed characteristics of the managed network switch 26 may include activation of a Rapid Spanning Tree Protocol (RSTP) loop management algorithm for the managed network switch 26. The one or more managed characteristics of the managed network switch 26 may include activation of a Virtual Local Area Network (VLAN) that provides a virtual network in which data transmitted over the virtual network by the managed network switch 26 is logically isolated. This way, different types of data may be transmitted over the same cable, for example, while each type of data is isolated from each other type of data. This may also help improve the security of the building control system.

The building controller 18 may be configured to determine a connection status of at least one of the plurality of network switch ports 28 of the managed network switch 26. The building controller 18 may be configured to determine a connection speed of at least one of the plurality of network switch ports 28 of the managed network switch 26. In some cases, the building controller 18 may be configured to encrypt/decrypt at least some of the data that is received by one or more of the plurality of network switch ports 28. The building controller 18 may be configured to encrypt at least some of the data that the building controller 18 is sending out via one or more of the plurality of network switch ports 28, for example.

The controller 24 may include or otherwise provide the functionality of a function block engine that is configured to execute one or more function blocks in order to generate the one or more control commands. In some cases, the function block engine may be configured to execute one or more function blocks that implement at least part of the managed network switch 26. It will be appreciated that the managed network switch 26 may be considered as being a combination of hardware and software. In some cases, the function block engine may execute one or more function blocks that receive user input for configuring one or more of the managed characteristics of the managed network switch 26. In some cases, the function block engine may include a Niagara™ function block engine, although other types are also contemplated.

Figure 3:
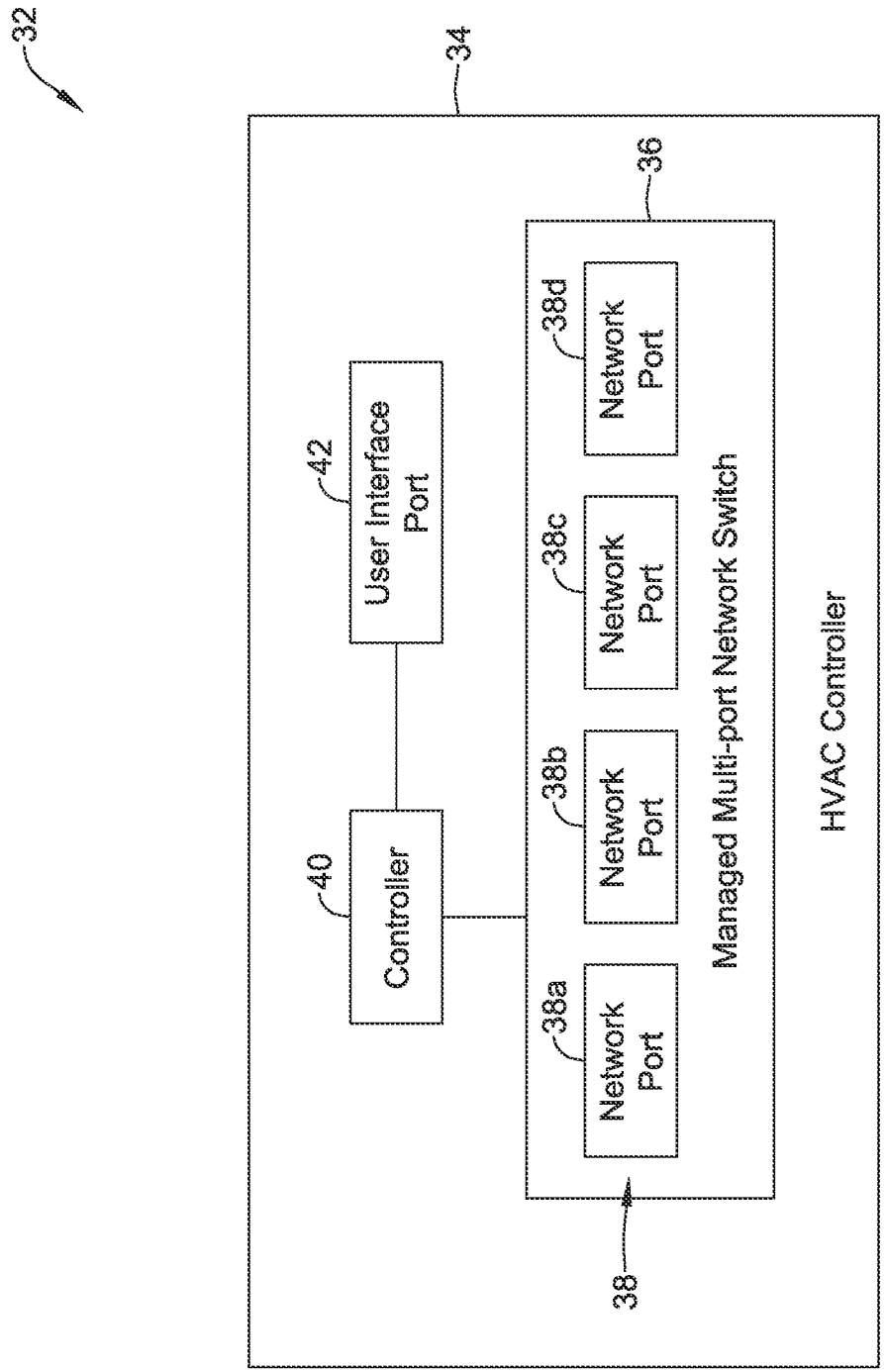
FIG. 3 is a schematic block diagram of an illustrative Heating, Ventilating and Air Conditioning (HVAC) controller.

FIG. 3 is a schematic block diagram of an illustrative HVAC controller 32 that is configured to control operation of at least part of an HVAC system of a building. The HVAC controller 32 may be considered as being an example of the building controller 14 and/or the building controller 18. The HVAC controller 32 includes a housing 34 that is configured to be secured to a mounting surface (e.g. a wall). A managed multi-port network switch 36 is carried by the housing 34, meaning that the managed multi-port network switch 36 may be housed by the housing 34, or may be secured to the exterior of the housing 34. The managed multi-port network switch 36 includes a plurality of network ports 38. The plurality of network ports 38 are individually labeled as 38a, 38b, 38c, 38d in FIG. 3. While a total of four network ports 38 are shown, in some cases the managed multi-port network switch 36 may include only one, two or three network switch ports 28. The managed multi-port network switch 36 may in some cases include five, six or more network ports 38. In some instances, at least some of the network ports 38 may be configured to operate at 10 megabits per second (Mb/s), at 100 Mb/s, 1000 Mb/s or more.

A controller 40 is disposed within the housing 34 and is operably coupled with the managed multi-port network switch 36. The controller 40 may be configured to output one or more control commands in order to control the operation of at least part of an HVAC system. The illustrative HVAC controller 32 includes a user interface port 42, which allows the HVAC controller 32 to communicate with devices exterior to the HVAC controller 32 in a manner that does not require communication through the managed multi-port network switch 36. For example, the user interface port 42 may allow the HVAC controller 32 to communicate with a computer such as but not limited to the computer 16 referenced in FIG. 1. The user interface port 42 may be configured to receive user input for configuring the managed multi-port network switch 36. For example, the user interface port 42 may be configured to receive user input to disable one or more of the plurality of network ports 38 that are not currently being used. The user interface port 42 may be configured to receive user input to restrict one or more of the plurality of network ports 38 to one or more specified MAC addresses, for example. In some instances, the user interface port 42 may be configured to receive user input in order to make a Quality of Service (QoS) selection for traffic prioritization.

The user interface port 42 may be configured to provide information to a user regarding the managed multi-port network switch 36. The user interface port 42 may be configured to provide information to a user regarding the managed multi-port network switch 36, wherein the information includes a connection status and/or connection speed of one or more of the plurality of network ports 38 of the managed multi-port network switch 36. The user interface port 42 may be configured to provide information to a user regarding the managed multi-port network switch 36, wherein the information includes diagnostic information for one or more of the plurality of network ports 38 of the managed multi-port network switch 36. In some cases, the user interface port 42 is a wireless port (e.g. WiFi or Bluetooth). In some cases, the user interface port 42 is a wired port. In some cases, the user interface port 42 may not be a separate port as shown, but instead may correspond to one of the network ports 38*a*-38*d*.

Figure 4:
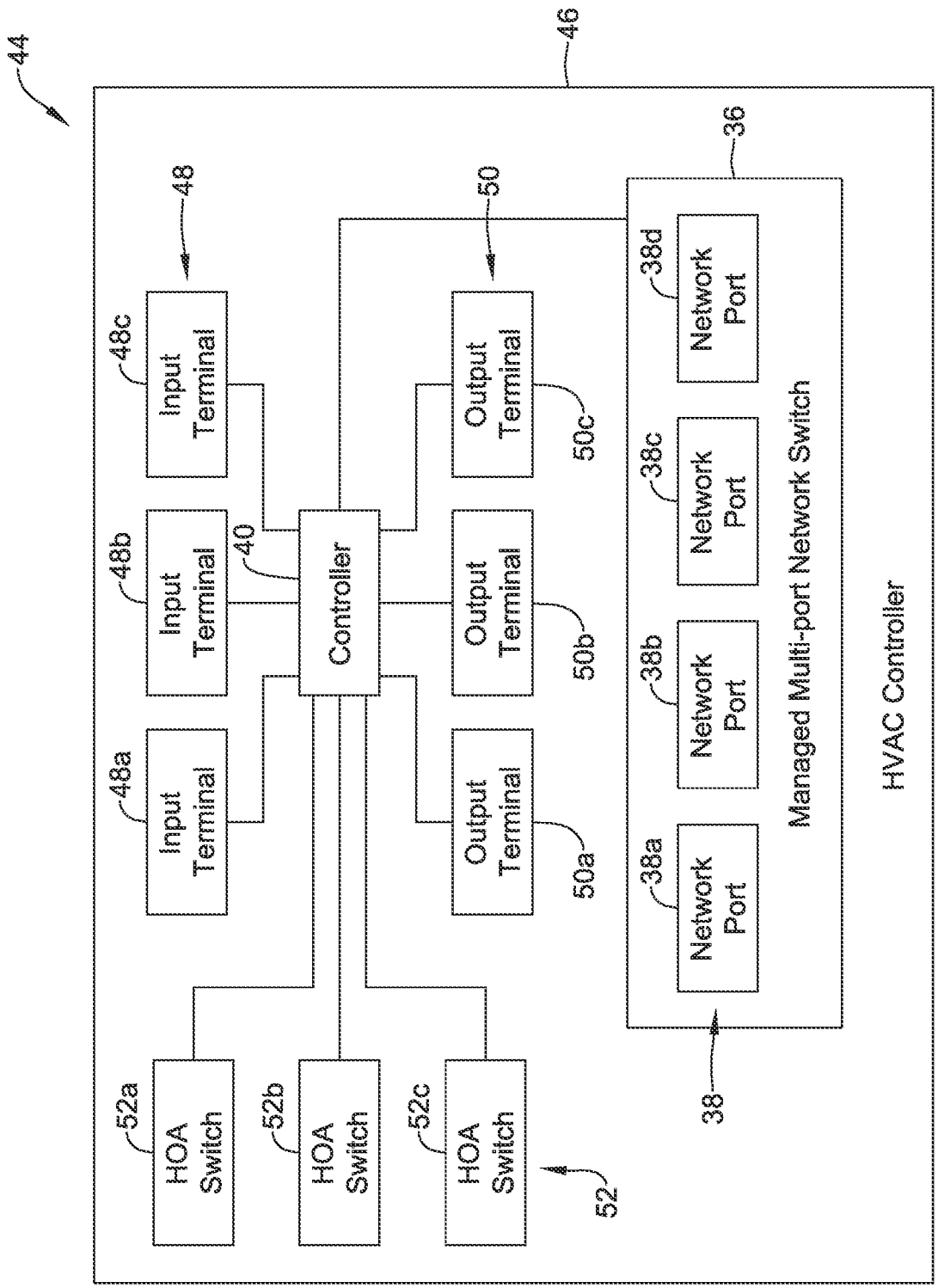
FIG. 4 is a schematic block diagram of an illustrative HVAC controller.

FIG. 4 is a schematic block diagram of an illustrative HVAC controller 44 that may be considered as being an example of the building controller 14 and/or 18 or the HVAC controller 32. The HVAC controller 44 includes a housing 46 and a number of input terminals 48 that are secured relative to the housing 46. The input terminals 48 are individually labeled as 48*a*, 48*b*, 48*c*. While a total of three input terminals 48 are shown, this is merely illustrative as the HVAC controller 44 may include any number of input terminals 48. The input terminals 48 are operably coupled with the controller 40, and each of the input terminals 48 may be considered as being configured to be wired to an output of an HVAC system component such as an HVAC system sensor or other HVAC system component.

The HVAC controller 32 includes a number of output terminals 50. The output terminals 50 are individually labeled as 50*a*, 50*b*, 50*c*. While a total of three output terminals 50 are shown, this is merely illustrative as the HVAC controller 44 may include any number of output terminals 50. Each of the output terminals 50 are operably coupled with the controller 40 such that the controller 40 outputs the one or more control commands to one or more HVAC system components via the output terminals 50.

In some cases, the HVAC controller 44 also includes a plurality of manually-actuated HAND-OFF-AUTO (HOA) switches 52, individually labeled as 52*a*, 52*b*, 52*c*. While a total of three HOA switches 52 are shown, it will be appreciated that this is merely illustrative, as the HVAC controller 44 may include any number of HOA switches 52. Each of the plurality of HOA switches 52 may be considered as being associated with a corresponding one of the output terminals 50. Each of the HOA switches 52 are operatively coupled to the controller 40. In some cases, the control signals outputted by the controller 40 via a particular one of the plurality of output terminals 50 may be influenced by whether a corresponding one of the plurality of HOA switches 52 is in its HAND (H) position, its OFF (O) position or its AUTO (A) position.

In FIG. 4, the controller 40 is shown operatively coupled to the managed multi-port network switch 36. In some cases, the controller 40 controls the operation of the managed multi-port network switch 36. In other cases, the managed multi-port network switch 36 includes a local controller that controls all or some of the operations of the managed multi-port network switch 36, and the controller 40 interfaces with the local controller. These are just example implementations.

Figure 5:
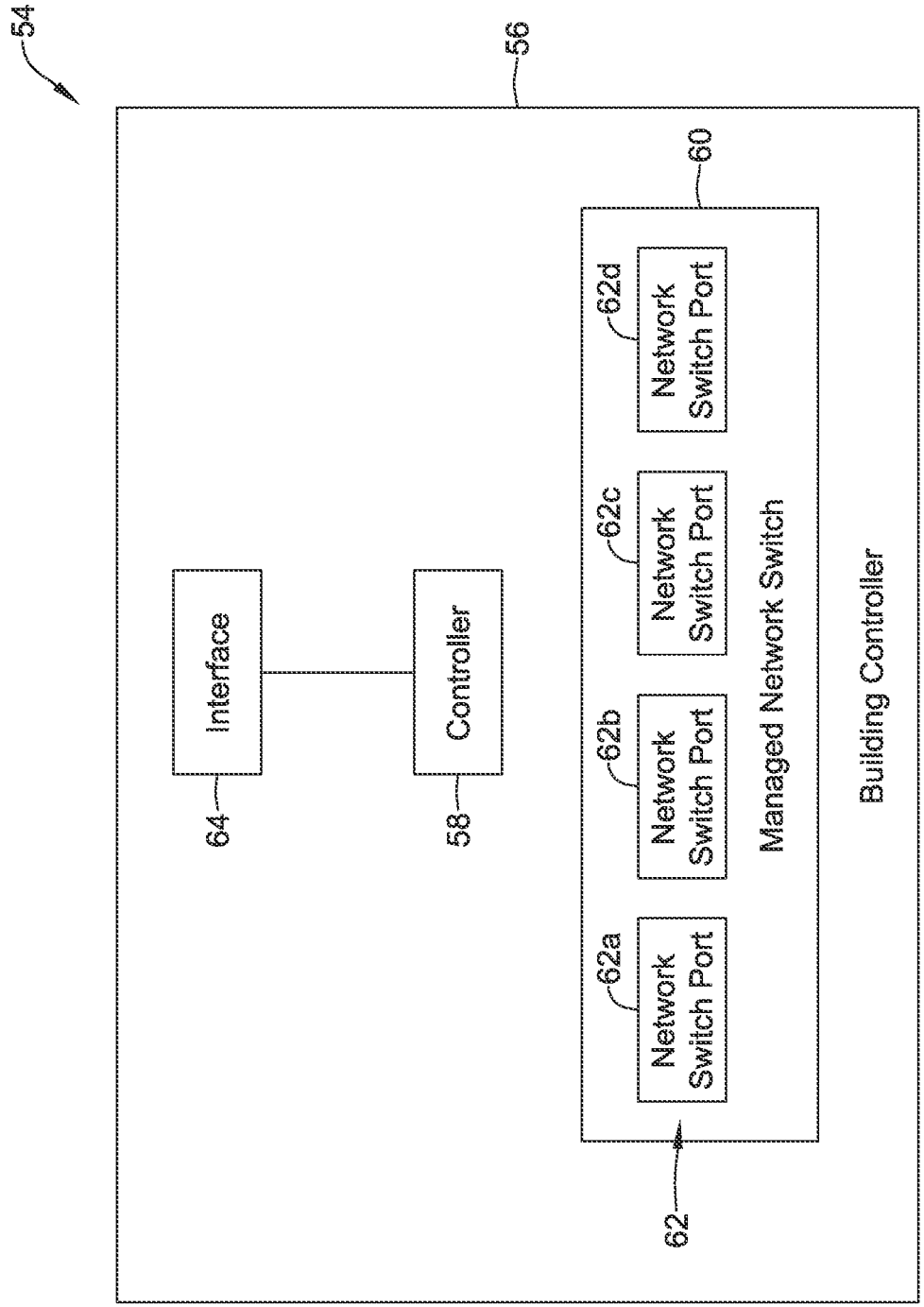
FIG. 5 is a schematic block diagram of an illustrative building controller.

FIG. 5 is a schematic block diagram of an illustrative building controller 54 that may be considered as being an example of the building controller 14 or the building controller 18. The building controller 54 is configured to control one or more building system components of a building control system (such as the building system 12). The building controller 54 includes a housing 56 and a controller 58 that is housed by the housing 56. The controller 58 is configured to output one or more control commands to control one or more building control components. The building controller 54 includes a managed network switch 60 that is housed by the housing 56. The managed network switch 60 includes a plurality of network switch ports 62 that are each accessible from outside of the housing 56 and are configured to be releasably secured to one or more network cables. The building controller 54 is configured to receive user input for configuring one or more managed characteristics of the managed network switch 60. The plurality of network switch ports 62 are individually labeled as 62*a*, 62*b*, 62*c*, 62*d*. While a total of four network switch ports 62 are shown, in some cases the managed network switch 60 may include only one, two or three network switch ports 62. The managed network switch 60 may in some cases include five, six or more network switch ports 62. In some instances, at least some of the network switch ports 62 may be configured to operate at 10 megabits per second (Mb/s), at 100 Mb/s, 1000 Mb/s or more.

The illustrative building controller 54 includes an interface 64 that is operably coupled with the controller 58. In some cases, the interface 64 may be a wireless interface for receiving from a remote device user input for configuring one or more managed characteristics of the managed network switch 60. These managed characteristics may include one or more of a Media Access Control (MAC) filtering characteristic that allows filtering by specific MAC address, for example. The one or more managed characteristics may include activation and/or deactivation of one or more of the plurality of network switch ports 62 of the managed network switch 60. This allows for deactivation of network switch ports 62 that are not being used, as well as activating network switch ports 62 that are newly being used. The one or more managed characteristics may include activation of a Rapid Spanning Tree Protocol (RSTP) loop management algorithm. The one or more managed characteristics may include activation of a Virtual Local Area Network (VLAN) that provides a virtual network in which data transmitted over the virtual network by the managed network switch 60 is logically isolated. The wireless interface may be used for outputting control command for controlling one or more building control components of a building control system.

In some instances, the interface 64 is a wired interface for receiving from a remote device user input for configuring one or more managed characteristics of the managed network switch 60. The wired interface may be used for outputting the one or more control commands to control one or more building control components of a building control system. In some cases, the wired interface may include one or more of the plurality of network switch ports 62. The wired interface may include one or more wiring contacts that are accessible from outside of the housing 56. These are just example implementations.

Figure 6:
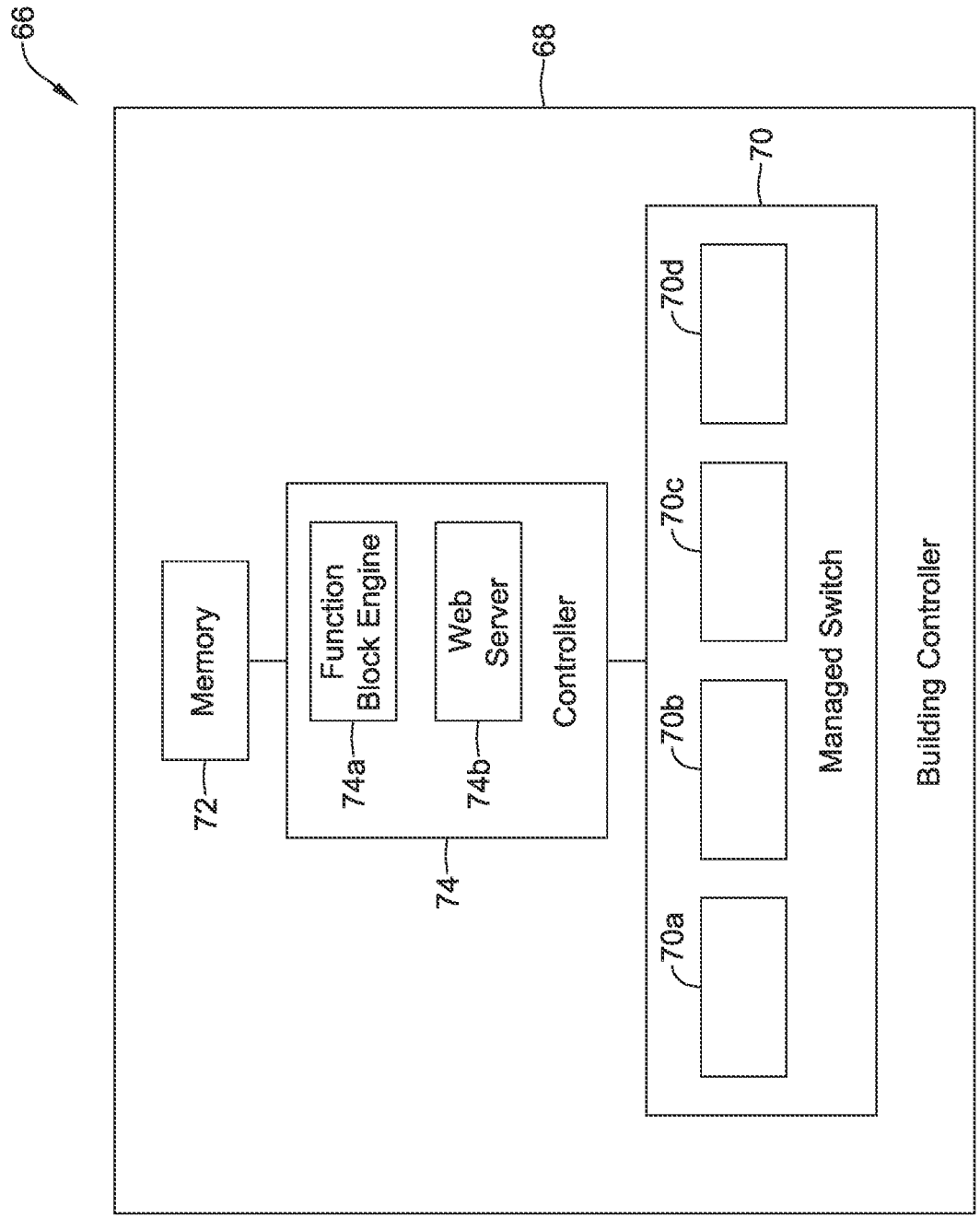
FIG. 6 is a schematic block diagram of an illustrative building controller.

FIG. 6 is a schematic block diagram of an illustrative building controller 66 that is configured to control operation of a building system component within a building. The building controller 66 may be considered as being an example of the building controller 14 or the building controller 18, for example. The building controller 66 includes a housing 68 that is configured to be secured to a mounting surface such as, but not limited, to a vertical surface such as a wall, a control panel, a DIN rail or the like. The building controller 66 includes a managed switch 70 that is secured relative to the housing 68 and includes a plurality of ports

70a, 70b, 70c, 70d. While a total of four ports 70a, 70b, 70c, 70d are illustrated, it will be appreciated that the managed switch 70 may have any number of ports. Each of the ports 70a, 70b, 70c, 70d permit a connection cable such as a network cable to be releasably secured to the particular port.

The illustrative building controller 66 includes a memory 72 that is configured to store one or more function blocks. A controller 74 is disposed within the housing 68 and is operably coupled with the memory 72 and the managed switch 70. The controller 74 is configured to execute a function block engine 74a, and in some cases a web server 74b. The function block engine 74a is configured to execute function blocks as part of operation of the controller 74 in controlling operation of the building system component. One or more of the function blocks that is stored in the memory 72 may be executable by the function block engine 74a in order to manage and/or control the managed switch 70.

One of the function blocks stored in the memory 72 and executable by the function block engine 74a may include a wire diagnostics algorithm that when executed by the function block engine 74a enables the building controller 66 to diagnose faults in any of the connection cables secured to one or more of the plurality of ports 70a, 70b, 70c, 70d. In some cases, the wire diagnostics algorithm would include a function block named "WireDiag" that would include internal input from the managed switch 70 including the individual ports 70a, 70b, 70c and 70d. The wire diagnostics algorithm may perform wire diagnostics at a fixed, timed, event driven or on-demand signal that would lead to initiation of a wire diagnostics function. Individual output error codes may be encoded into a packed byte as follows: short to ground, open circuit, short to adjacent circuit, and normal operation. Operation and features may be implemented that are appropriate for the ethernet or other physical media including polarity reversal, cable swap, cable length, cable short distance, termination impedance characteristics, characteristic impedance, and speed diagnostics.

One of the function blocks in memory 72 and executable by the function block engine 74a may include a loop detection algorithm that when executed by the function block engine 74a enables the building controller 66 to diagnose performance of any loops the building controller 66 is part of. In some cases, the loop detection algorithm may be manifested in a function block named "loopDet" that would include internal inputs from the managed switch 70. If the device receives a packet that it sent, a loop has occurred to the device. In some cases, loops may cause broadcast storms which degrade network performance. This feature can be used to detect whether a loop has occurred.

One of the function blocks stored in the memory 72 and executable by the function block engine 74a may include a filtering algorithm that when executed by the function block engine 74a enables the building controller 66 to perform Media Access Control (MAC) filtering. In some cases, the filtering algorithm may be manifested in a function block named "filterMAC" that would receive internal input from the managed switch 70. Upon identification of cybersecurity issues or a predefined input or manual event, function block or network status conditions, the function block may provide individual port filtering controls to activate or deactivate one or more of the port's filtering settings.

One of the function blocks stored in the memory 72 and executable by the function block engine 74a may include a port deactivation algorithm that when executed by the function block engine 74a enables the building controller 66 to selectively activate or deactivate one or more of the plurality of ports 70a, 70b, 70c, 70d within the managed switch 70. In some cases, the port deactivation algorithm may be manifested in a function block named "portDeact" that would include internal input from the managed switch 70. If the function block receives an input, an event or a schedule, then the function block would provide outputs to activate or deactivate certain ports as needed.

One of the function blocks stored in the memory 72 and executable by the function block engine 74a may include a connection status algorithm that when executed by the function block engine 74a determines and displays a connection status for each of the plurality of ports 70a, 70b, 70c, 70d. In some cases, the connection status algorithm may be manifested in a function block named "portConnectStatus" that would include internal input from the managed switch 70. The status of the port connection, including for example speed, duplex, mode, errors and/or additional information, would result in status information being available to the function block outputs. One of the function blocks stored in the memory 72 and executable by the function block engine 74a may include a connection speed algorithm that when executed by the function block engine 74a determines and displays a connection speed for each of the plurality of ports 70a, 70b, 70c, 70d.

One of the function blocks stored in the memory 72 and executable by the function block engine 74a may include a loop management algorithm that when executed by the function block engine 74a allows the building controller 66 to be part of one or more loops. In some cases, the loop management algorithm may be manifested in a function block named "LanLoopMgmt" that would include internal input from the managed switch 70. The function block can control the building controller to belong or not belong to one or more ethernet circuits or loops. The loop management algorithm may include a Rapid Spanning Tree Protocol (RSTP) loop management algorithm, for example. The RSTP loop management algorithm may be manifested in a function block named "RSTPloopMgmt" that would include internal input from the managed switch 70. By use of the function block, events, inputs or information from the network may trigger certain behaviors related to configuration or settings of the RSTP loop. Individual RSTP loops may be enabled or disabled, or configuration information may be changed.

One of the function blocks stored in the memory 72 and executable by the function block engine 74a may include a Virtual Local Area Network (VLAN) configuration algorithm that when executed by the function block engine 74a enables the building controller 66 to form two or more virtual networks in which data transmitted by one of the connection cables is separated into the two or more virtual networks, with each virtual network isolated from each other virtual network. In some cases, the VLAN configuration algorithm may be manifested in a function block named "VLanLoops" that would include internal input from the managed switch 70. The function block may change or configure VLAN information based on inputs from the network switch, events, and/or other inputs. Individual VLAN settings may be changed or enabled or disabled as appropriate.

The web server 74b, when provided, enables the controller 74 to output a plurality of web pages for configuring the building controller 66. For example, one or more of the plurality of web pages may enable a user to turn off one or more of the plurality of ports 70a, 70b, 70c, 70d that are not being used. One or more of the plurality of web pages may enable display of a connection status and/or speed for each of the plurality of ports 70a, 70b, 70c, 70d. One or more of the plurality of web pages may enable display of port fault diagnostic information. In some cases, a function block named "PortFaultDiagn" would include internal input from the managed switch 70. Through manual input, events or schedules, the port diagnostic information can be run and the output can be available in the output of the function block or stored in a status file. One or more of the plurality of web pages may enable display of status of each RSTP connection.

One or more of the plurality of web pages may enable a user to restrict one of the plurality of ports 70a, 70b, 70c, 70d to a specific MAC address. One or more of the plurality of web pages may enable display of a MAC address that is assigned to a particular one of the plurality of ports 70a, 70b, 70c, 70d. A function block named "MacAsn" may include internal input from the managed switch 70. By input, event or schedule, the MAC address of the ports may be assigned to a particular address, may be enabled for display, and/or may enable display of downstream MAC addresses that are available. The function block may also determine the status of the managed switch 70. One or more of the plurality of web pages may enable display of a list of downstream MAC addresses that are connected to a particular one of the plurality of ports 70a, 70b, 70c, 70d. One or more of the plurality of web pages may enable a user to see a status of the managed switch 70.

One or more of the plurality of web pages may enable a user to make Quality of Service (QoS) selections for traffic prioritization. In some cases, a function block named "QOSsel" would include internal input from the managed switch 70. If the input, event, schedule or other network condition so enables, then the function block may use the QOS to determine inadvertent amount of network usage and may make adjustments to the overall allocation of bandwidth. One or more of the plurality of web pages may enable a user to set rate limits in order to improve bandwidth allocation. One or more of the plurality of web pages may enable loop detection and broadcast storm controls. One or more of the plurality of web pages may enable port mirroring for network monitoring. These are just examples.

Figure 7:
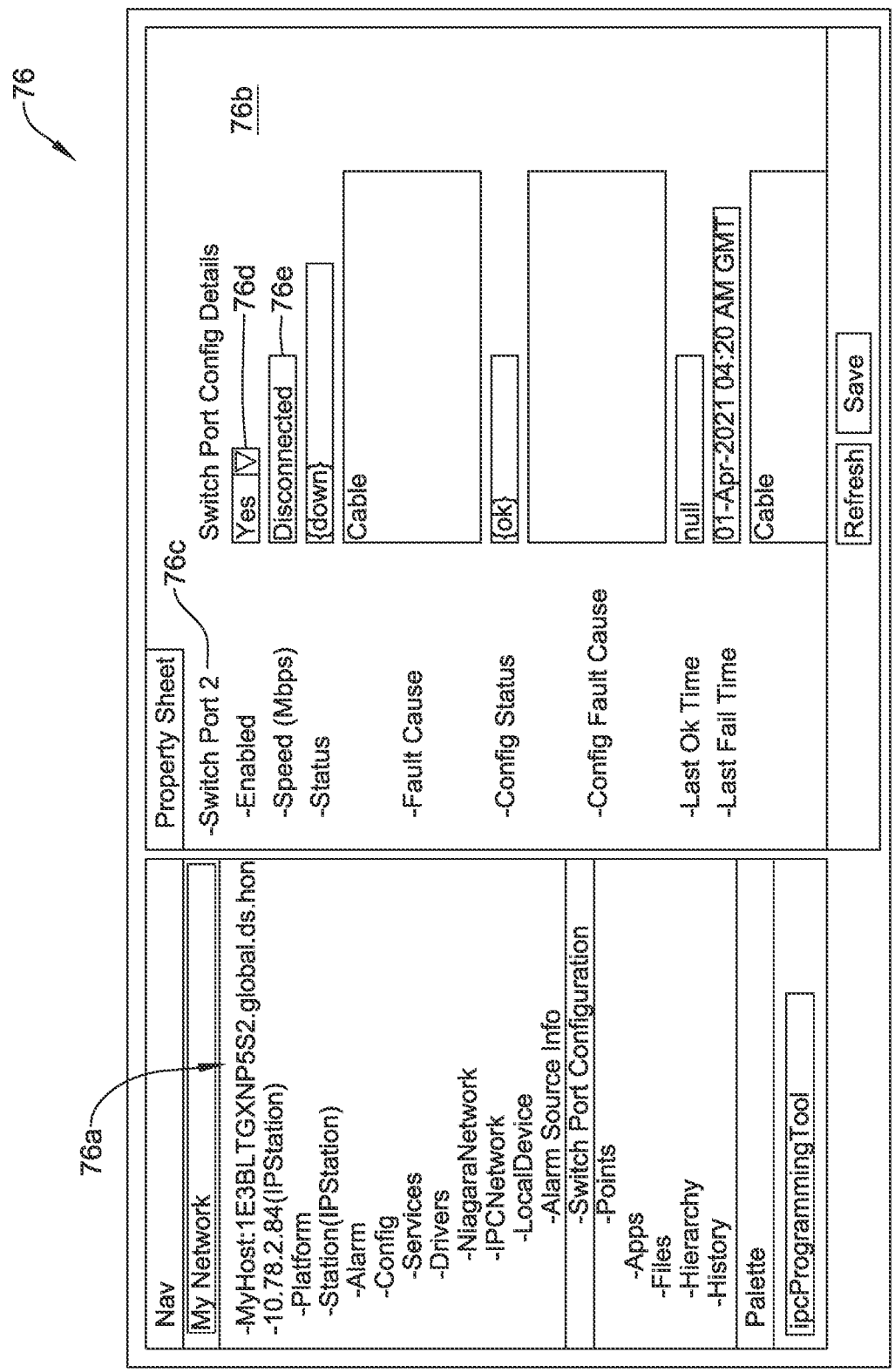

FIGS. 7 through 16 are screen shots showing illustrative screens that may be displayed by a computer such as the computer 16 (FIG. 1) in conjunction with the building controllers 14, 18, 54, 66 and/or the HVAC controllers 32, 44 described herein. FIG. 7 provides a screen 76 that includes a hierarchal menu portion 76a and a property sheet portion 76b. The property sheet portion 76b provides information regarding switch port 2, as indicated by nomenclature 76c. The switch port 2 is enabled, as indicated at 76d, but is currently disconnected, as indicated at 76e. Additional information is also displayed.

Figure 8:
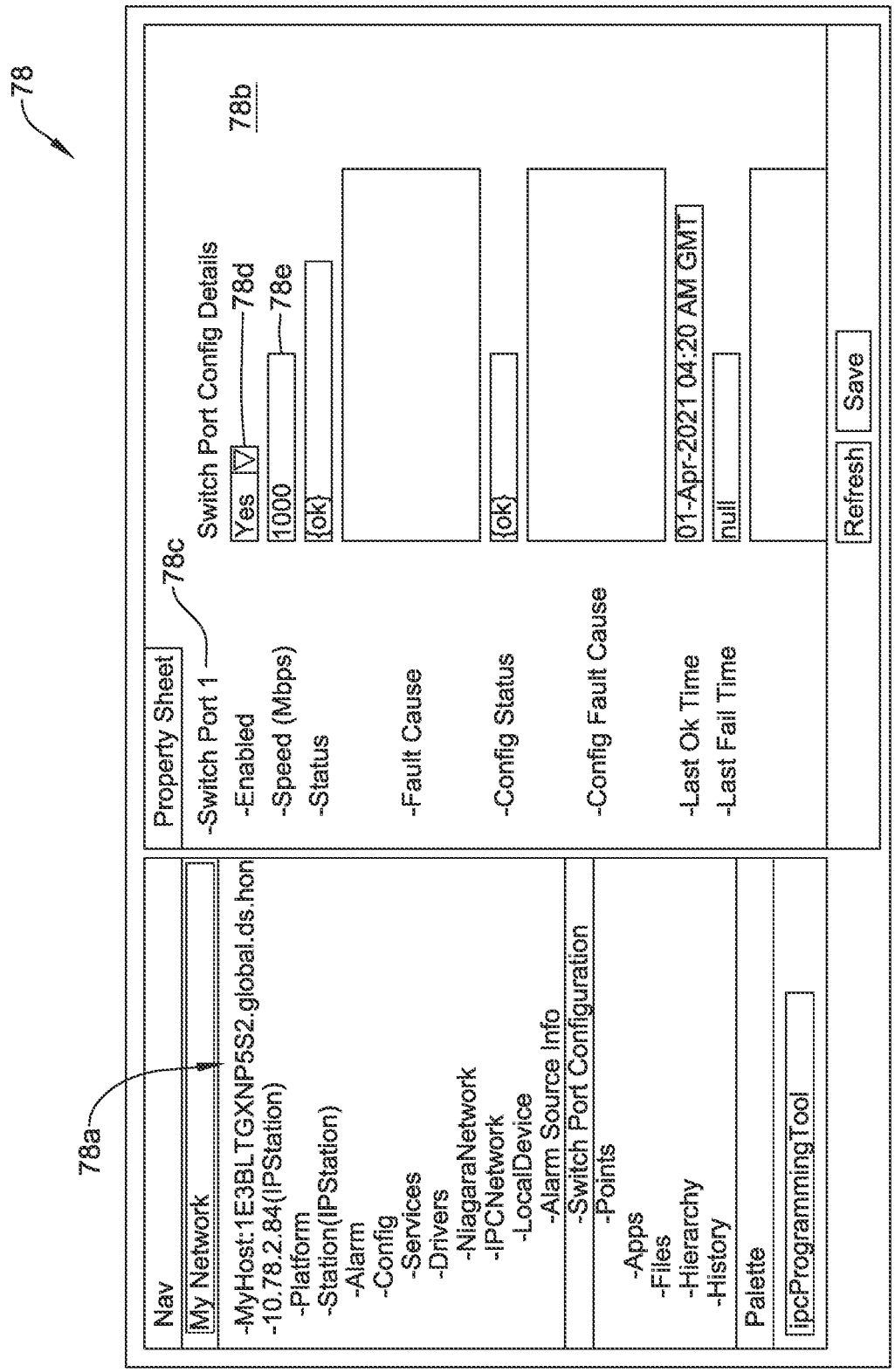

FIG. 8 provides a screen 78 that includes a hierarchal menu portion 78a and a property sheet portion 78b. The property sheet portion 78b provides information regarding switch port 1, as indicated by nomenclature 78c. The switch port 1 is enabled, as indicated at 78d, and is currently running at a speed of 1000 Mbs, as indicated at 78e. Additional information is also displayed.

Figure 9:
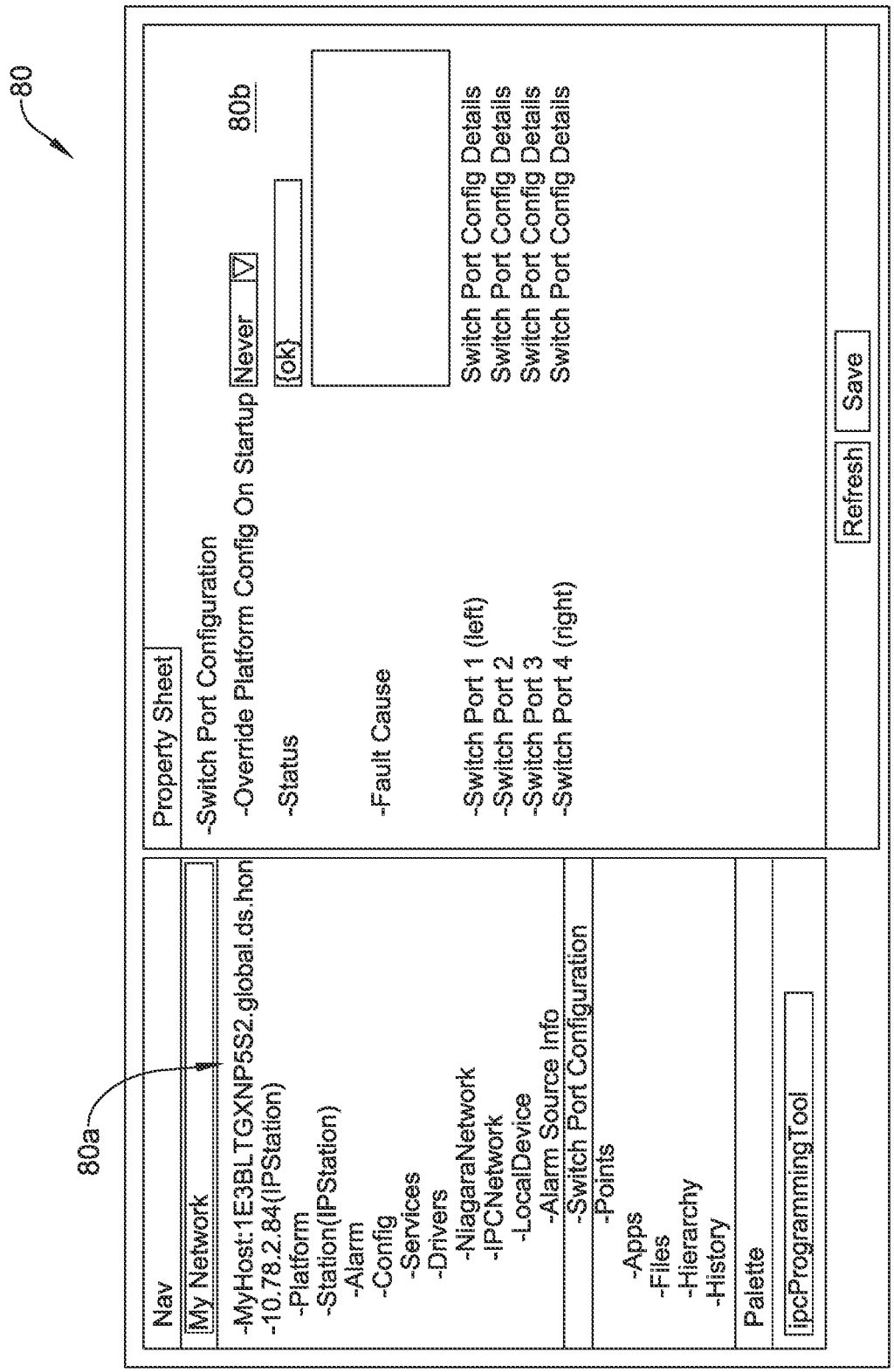
Figure 10:
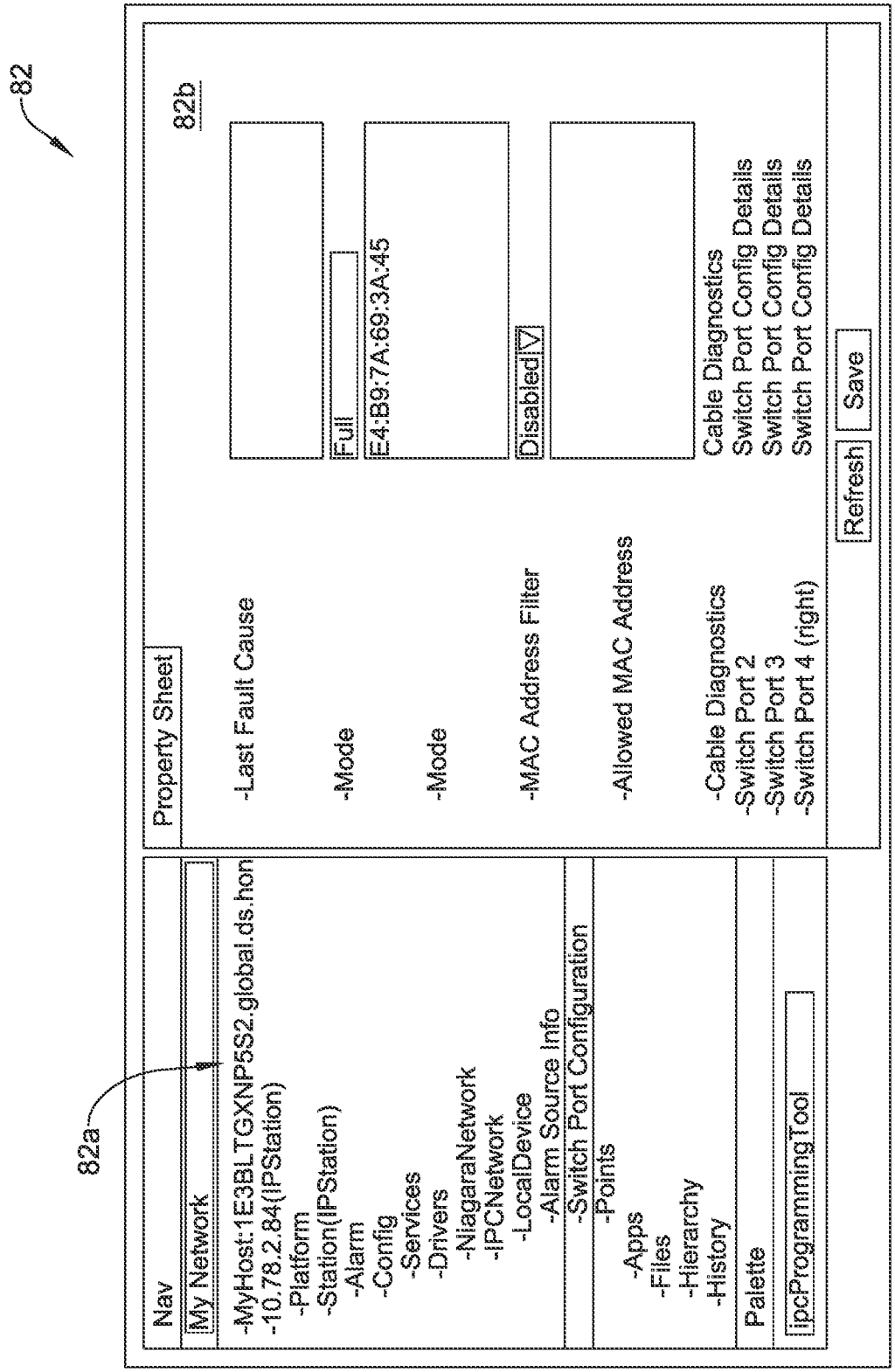
Figure 11:
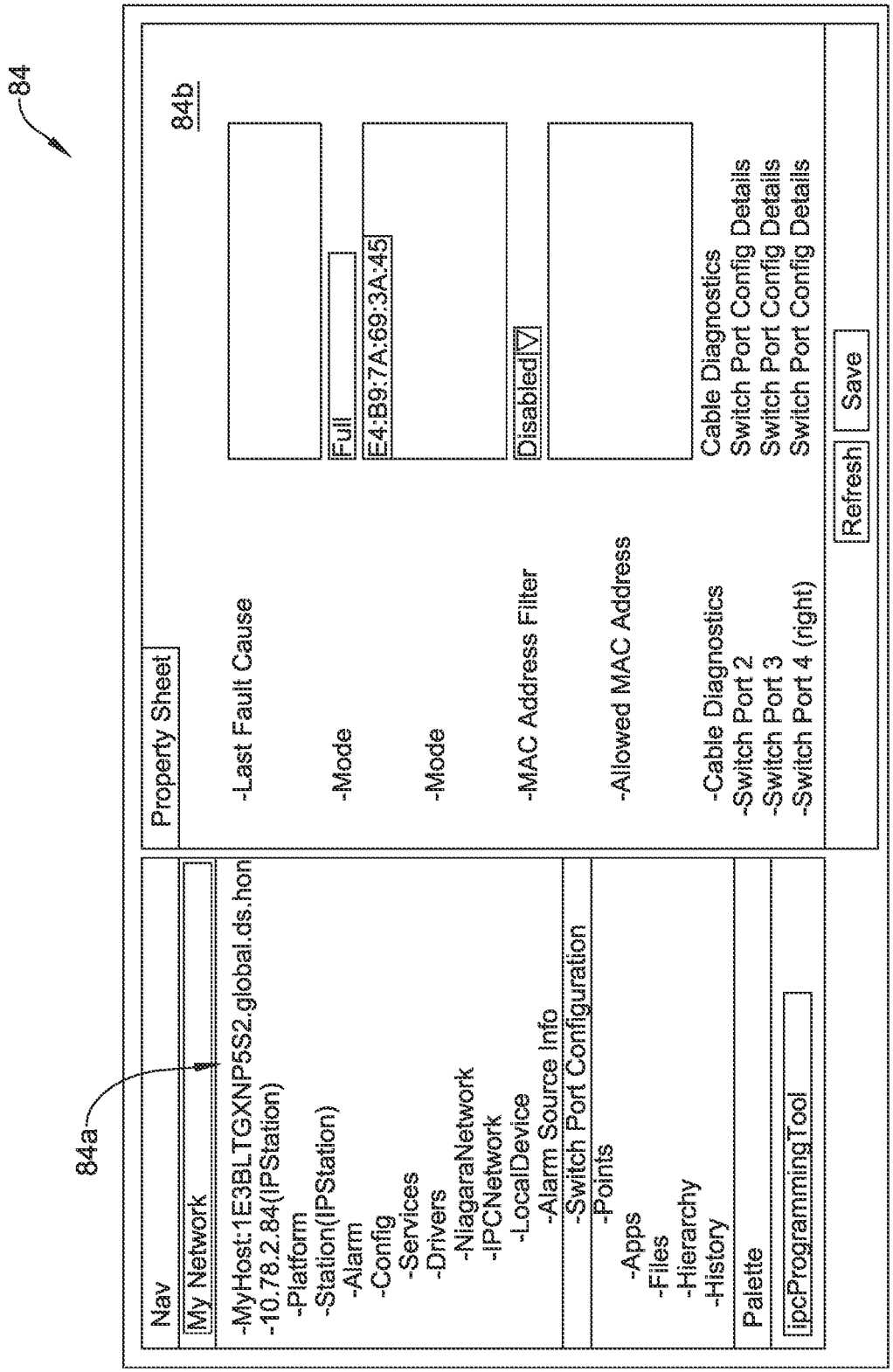
Figure 12:
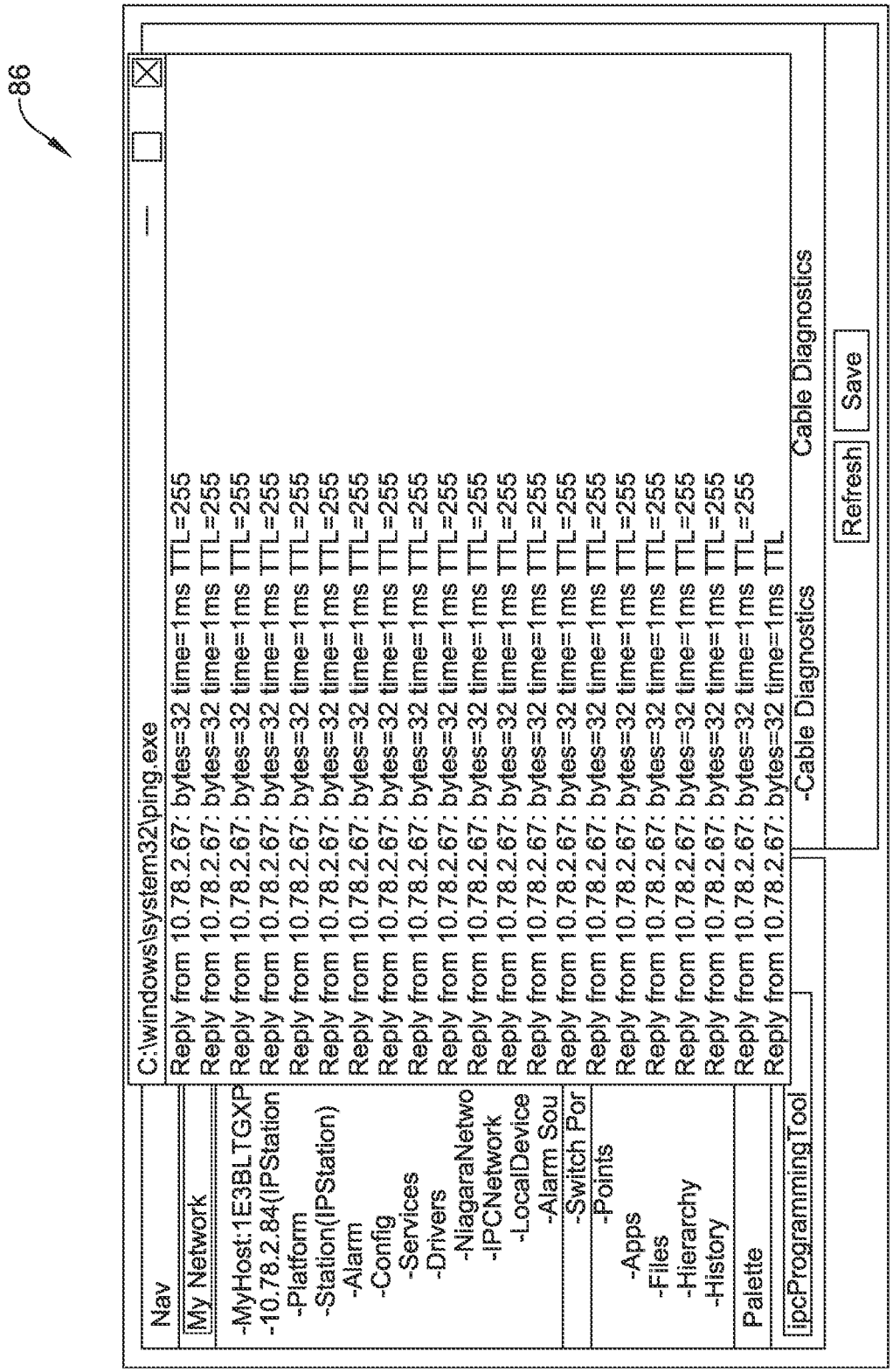

FIG. 9 provides a screen 80 that includes a hierarchal menu portion 80a and a property sheet portion 80b that describes fault information. FIG. 10 provides a screen 82 that includes a hierarchal menu portion 82a and a property sheet portion 82b that describes fault information. FIG. 11 provides a screen 84 that includes a hierarchal menu portion 84a and a property sheet portion 84b that describes fault information. FIG. 12 provides a screen 86 showing communication pings to a particular IP address initiated by a user.

Figure 13:
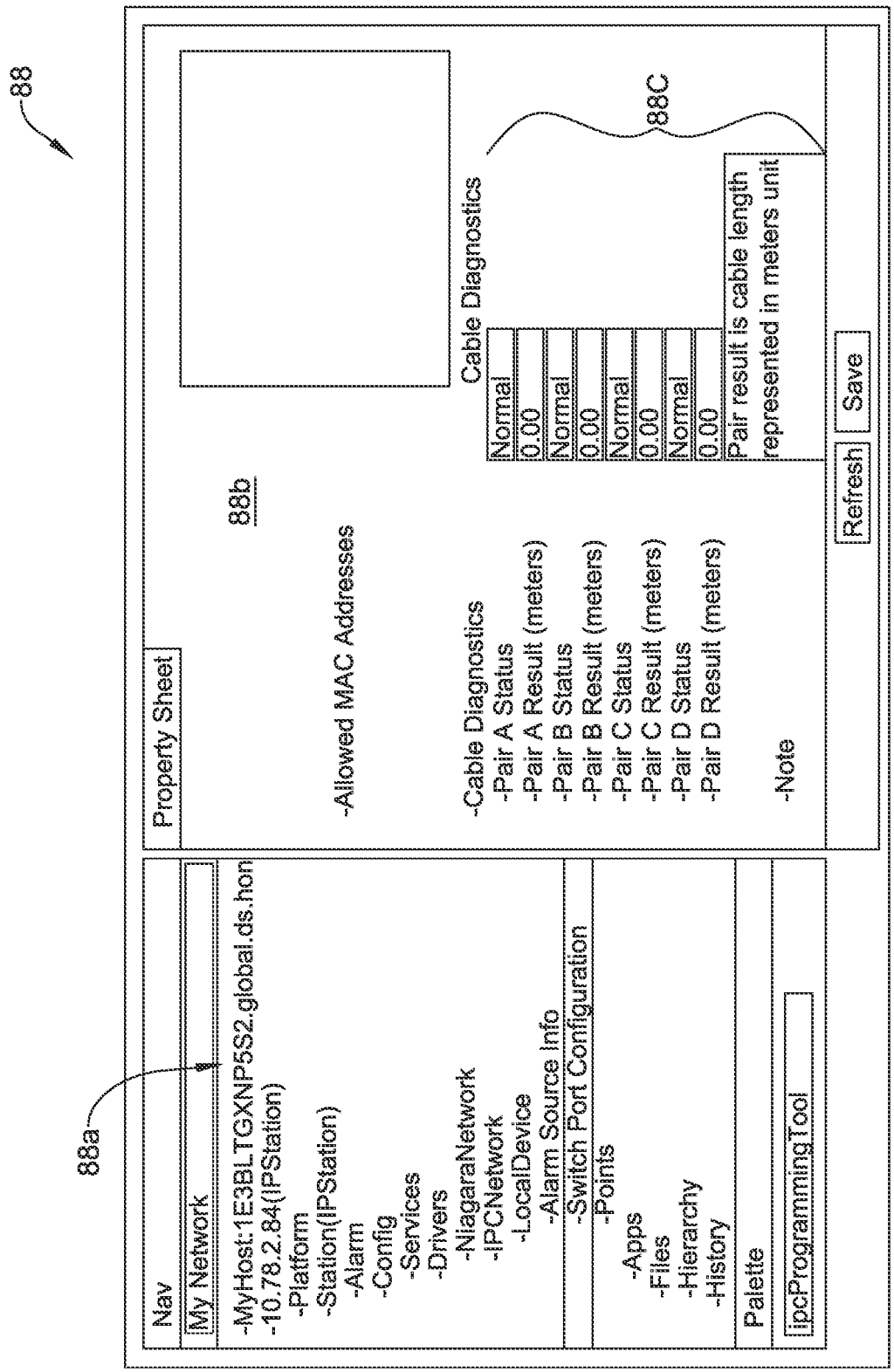
Figure 14:
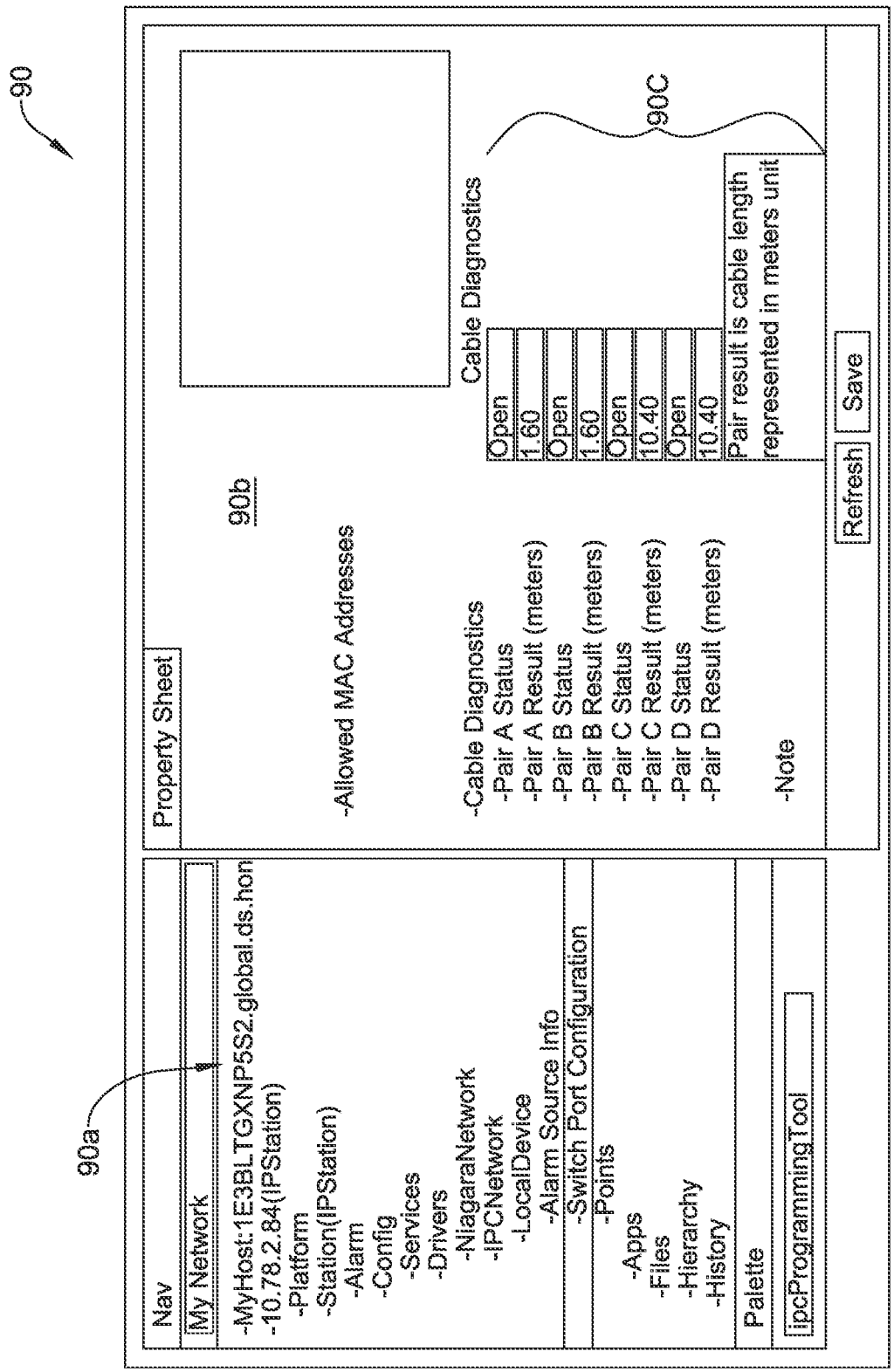

FIG. 13 provides a screen 88 that includes a hierarchal menu portion 88a and a property sheet portion 88b that includes cable diagnostics information. As can be seen in cable diagnostics section 88c, each of the four cables (Pair A, Pair B, Pair C and Pair D) appear to be healthy. FIG. 14 provides a screen 90 that includes a hierarchal menu portion 90a and a property sheet portion 90b that includes cable diagnostics information. In contrast with the screen 88, the screen 90 shows in cable diagnostics section 90c, each of the four cables (Pair A, Pair B, Pair C and Pair D) appear to have breaks in the cables. Pair A and Pair B each appear to have a break that is 1.6 meters away and Pair C and Pair D each appear to have a break that is 10.4 meters away. This information can facilitate cable repair, for example.

Figure 15:
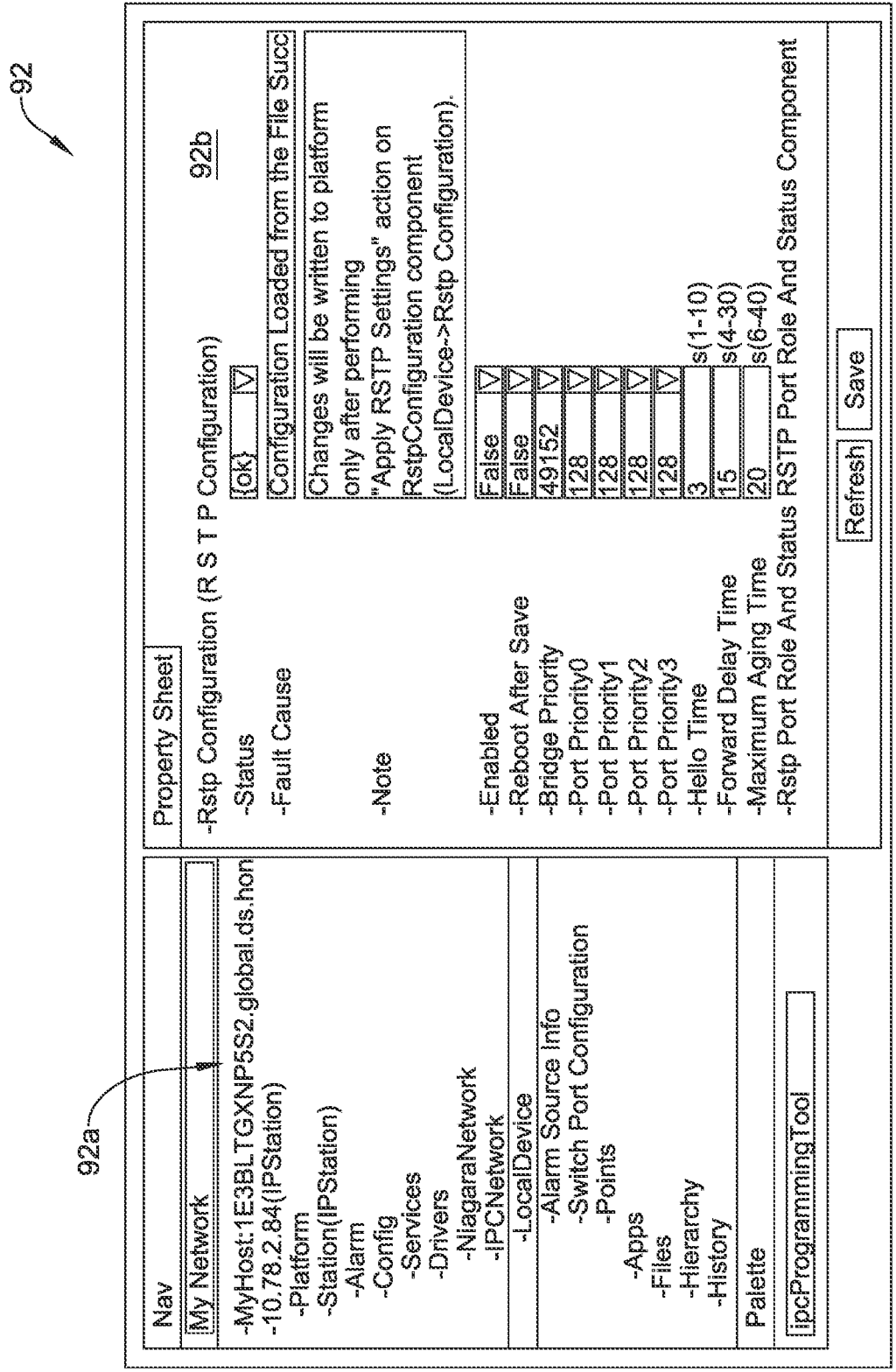

FIG. 15 provides a screen 92 that includes a hierarchal menu portion 92a and a property sheet portion 92b that includes RSTP loop configuration information. The property sheet portion 92b lists a number of RSTP loop properties, and their current values. FIG. 16 provides a screen 94 that includes a hierarchal menu portion 94a and a property sheet portion 94b that includes RSTP loop configuration information. The screen 94 is the same as the screen 92, although has been scrolled further down to reveal additional information.

Figure 17:
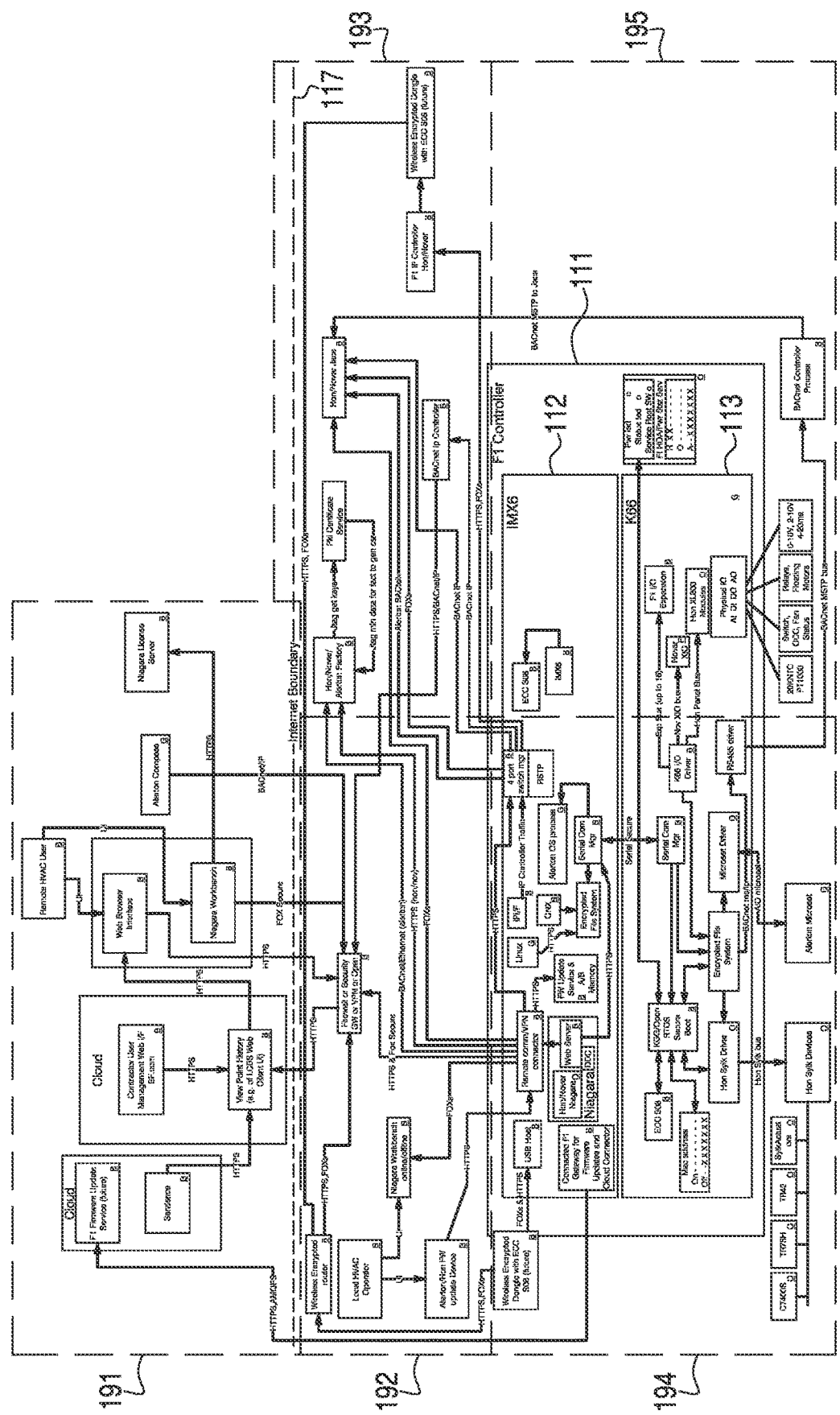
FIG. 17 is a diagram of an illustrative system and approach.
Figure 18A:
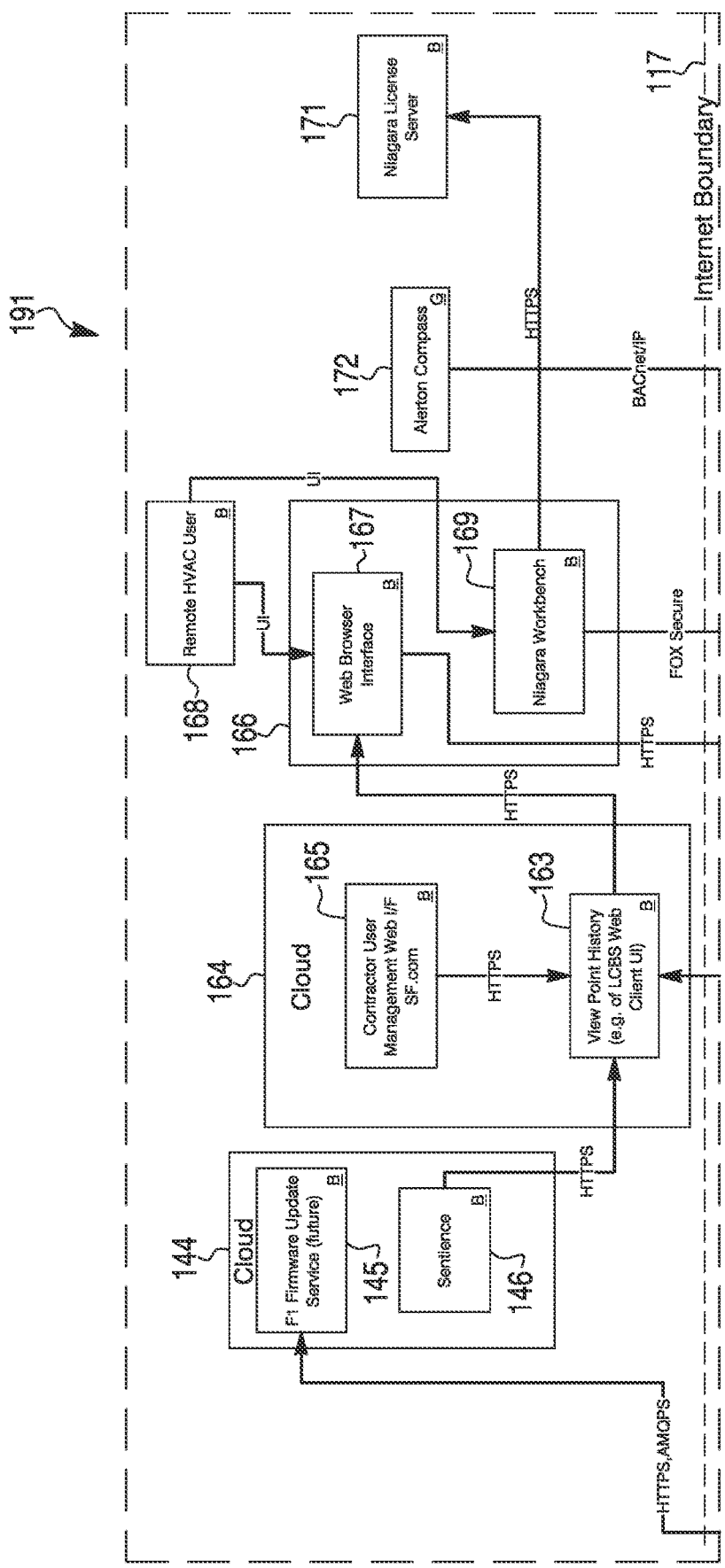
FIGS. 18A, 18B, 18C, 18D and 18E are diagrams of enlarged portions from FIG. 17.

FIG. 17 is a diagram of a summary view of a controller 111 and associated components. The controller 111 may be an example implementation of one or more of the building controller 14, building controller 18, HVAC controller 32, HVAC controller 44, building controller 54, building controller 66. FIGS. 18A, 18B, 18C, 18D and 18E show portions 191, 192, 193, 194 and 195, respectfully of FIG. 17. FIGS. 18D and 18E show portions 194 and 195, respectfully, revealing that controller 111 may have a card or board 112 and a card or board 113. There may be just one board or more than two boards. For illustrative purposes, there may be two boards. Card 112 may have a 4-port switch 114 having a speed of one or more Gbps. Port switch 114 may have a hypertext transfer protocol secure (HTTPS) input from a remote comm/virtual private network (VPN) connector 115. Connector 115 may also have an input of IP controller traffic from IP interface (I/F) 116. Two other ports of switch may be connected outside of controller 111 and across an internet boundary 117. Remote comm/VPN 115 may have connections outside of controller 111.

A Niagara component 118 on board 112 may have a web server 119 and component 121 connected to remote comm/VPN connector 115. A function block engine may be situated in component 121 and have a direct digital control connection to remote comm/VPN connector 115. An HTTPS connection from remote comm/VPN connector 115 may go to a firmware (FW) update service and AB memory.

An IMX6 123 may be connected to an elliptic curve cryptography (ECC) 508 124. These components may be substituted with similar components from different makers. A serial communication mgr 125 may be connected to an operating system (OS) processor 126 and to an encrypted file system 127. An ONX 128 and a Linux 129 may be connected to encrypted file system 127.

Serial com mgr 125 of board 112 may have a connection to a serial com mgr 131 of board 113. There is serial security between components 125 and 131 via a high speed (e.g., greater than one Gbps) channel 185 connecting components 125 and 131. Data that are static and moving between components may be encrypted.

Serial com mgr 131 may be connected to an encrypted file system 132. An IO driver 133 may be connected to encrypted file system 132. Driver 133 may provide an expansion bus (up to 16) to controller IO expansion component 134, and signals to X10 bus 135 and panel bus signals to a company's XL800 modules 136. BACnet master-slave/token-passing (MSTP) signals may go from encrypted file system 132 to an RS 485 driver 137. Signals may go from encrypted file system 132 to a microset driver 138. Signals may also go from encrypted file system 132 to Sylk™ driver 139. An open real-time operating system (RTOS)-secure boot 141 may provide signals to encrypted file system 132 and to ECC 508 142. Mac address information from boot 141 may be provided to block 188.

A physical IO 181 may be associated with modules 136 and provide AI, DI, DO and AO terminals, which may connected to a variety of devices 182, for example, "20KNTC PT1000", "Switch, OCC, Fan Status", "Relays, Floating Motors", and "0-10V, 2-10V, 4-20ma", respectively.

A hand-off-auto (HOA) board 184 may be connected to open RTOS-secure boot 141. One part of board 184 may reveal Power, Status and Service Request SW, with LED's. Another part of board 184 may reveal HOA control, and hand-off-auto switches. An H selection may enable an output to the web server, an O selection may disable an output to the web server, and an A selection may provide an automatic signal to the web server. With an A selection, the function block engine may be activated to output a signal or calculation command as directed by the automatic signal.

A connected controller 111 gateway 143 for firmware updates and a cloud connector, may provide HTTFS, advanced message queuing protocol signals (AMQPS) across internet boundary 117 to a controller 111 firmware update service component 145 of a cloud 144.

A USB host 147 may have a FOXs & HTTPS connection to a wireless encrypted dongle 148 with ECC 508. An HTTPS, FOXs connection may go from dongle 148 to a wireless encrypted router 149. A connection may go from a PW update device 151 to remote comm/VPN connector 115. A local HVAC operator station 152 may have a UI connection to FW update device 151 and a UI connection to a Niagara workbench 153 online/offline. A FOXs connection may go from remote comm/VPN connector 115 to Niagara workbench 153.

Figure 18B:
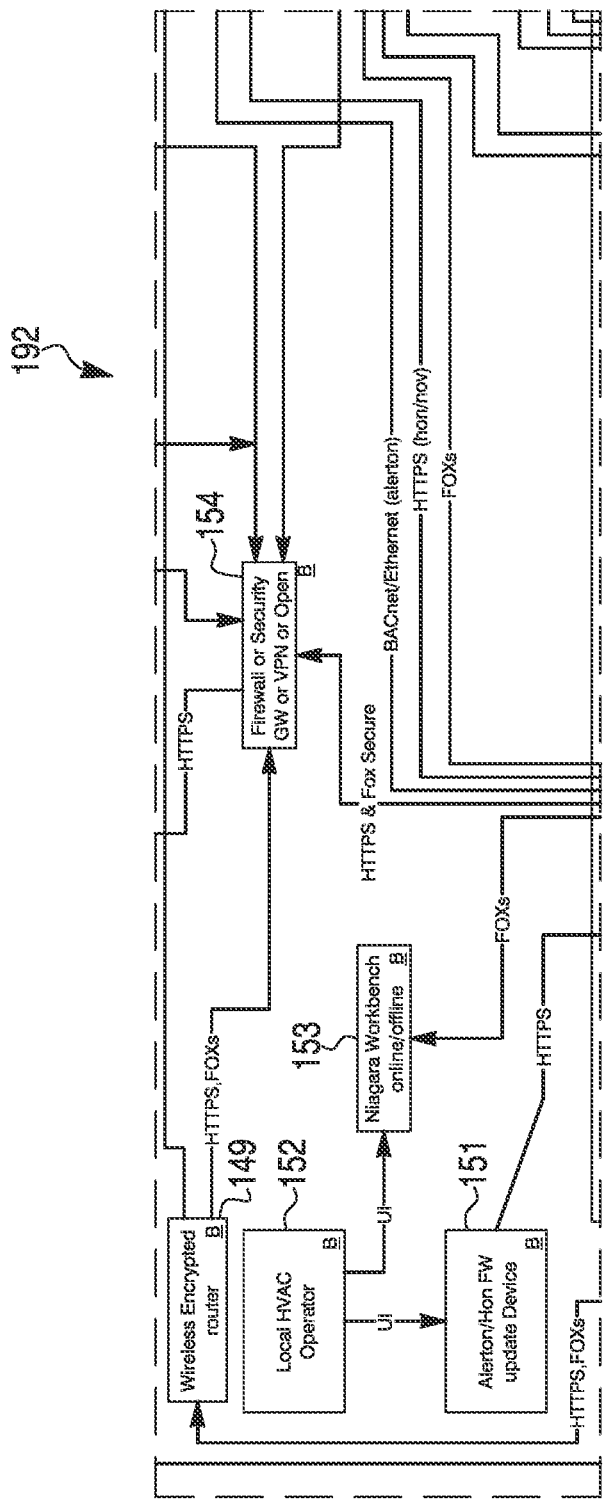

An HTTPS, FOXs may go from wireless encrypted router 149 to a firewall or security GW or VPN or open mechanism 154 shown in portion 192 of FIG. 18B. An HTTPS & FOX secure connection may go from remote comm/VPN connector 115 to mechanism 154 in portion 192 of FIG. 18B. A BACnet/Ethernet connection may go from remote comm/VPN connector 115 to factory 155. An HTTPS connection may go from remote comm/VPN connector 115 to factory 155.

Power over Ethernet (PoE) is a technology for wired Ethernet local area networks (LANs) that may allow the electrical current necessary for the operation of each device to be carried by the data cables rather than by power cords. This technology may be useful in expansion or chain connections of components such as subsystems, systems, controllers, and so forth.

Figure 18C:
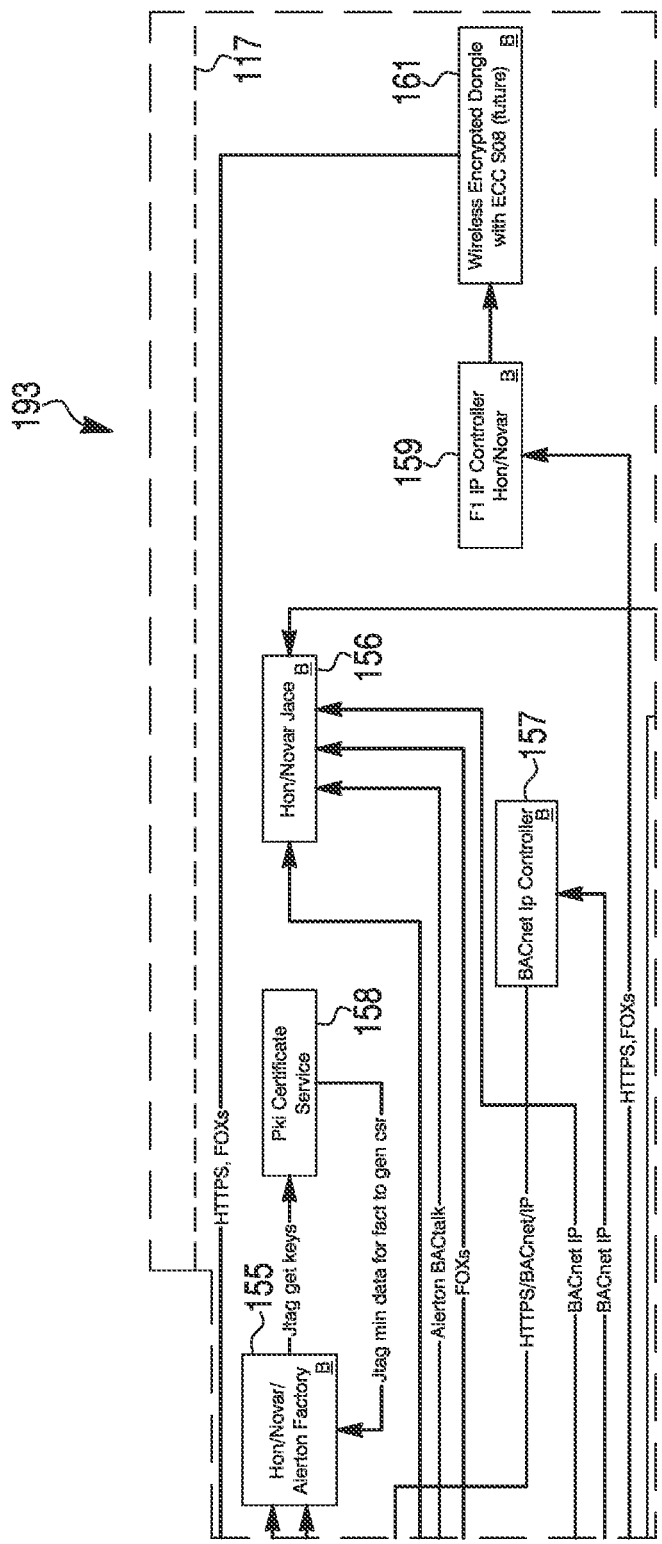
Figure 18D:
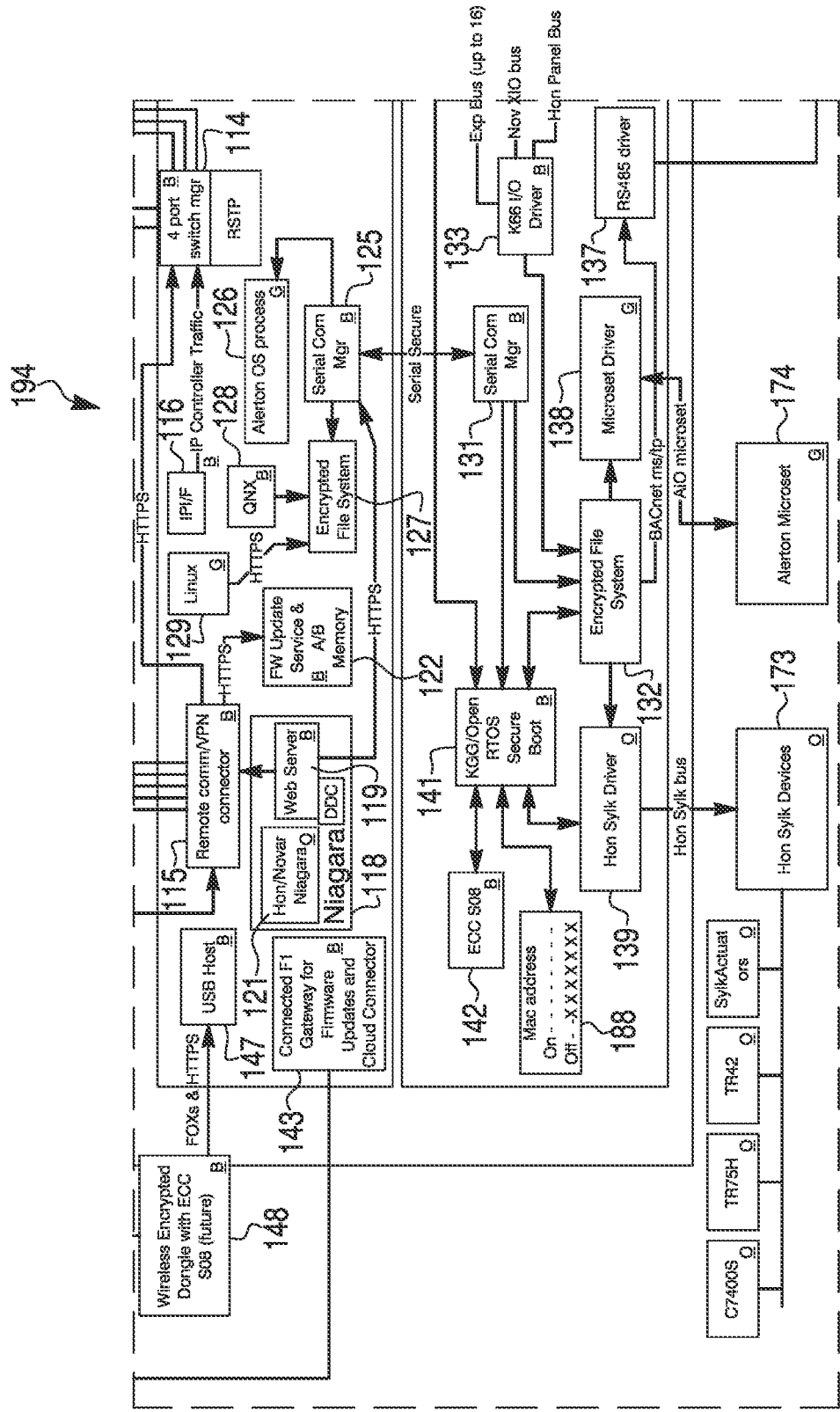
Figure 18E:
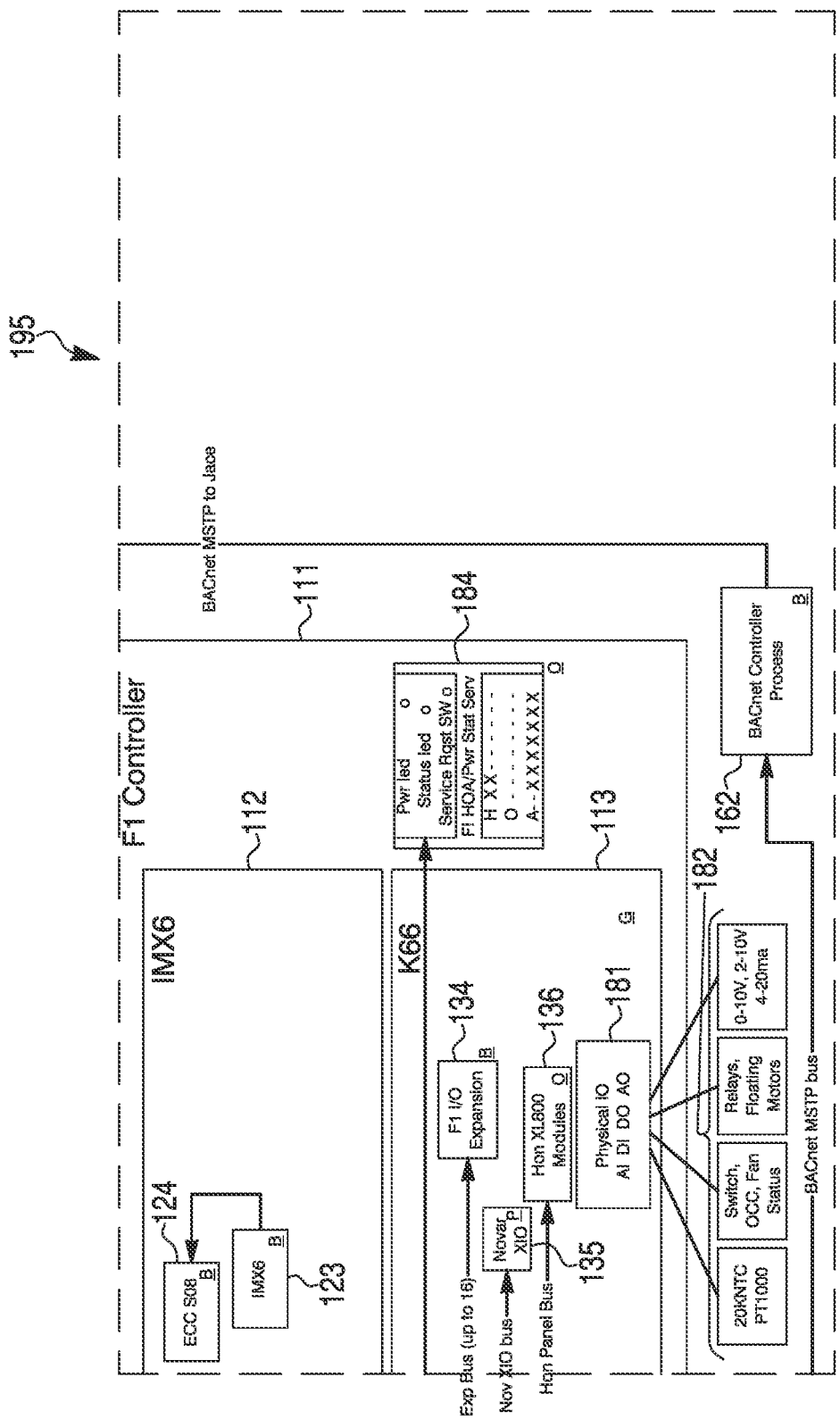

A FOXs connection may go from remote comm/VPN connector 115 to a JACE 156 as shown in portion 193 of FIG. 18C. A BACnet connection may go from four-port switch mgr 114 to JACE 156. A FOXs connection may go from switch 114 to JACE 156. A BACnet IP connection may go from switch 114 to JACE 156. A BACnet IP connection may go from switch 114 to a BACnet to controller device 157. An HTTPS/BACnet/IP connection may go from device 157 to mechanism 154. A "joint test action group (jtag) get Keys" connection may go from factory 155 to a public key infrastructure (Pki) certificate service module 158. A "jtag min data for fact to gen certificate signing request (csr)" connection may go from Pki service module 158 to factory 155. An HTTPS FOXs connection may go from switch 114 to controller 111 box 159. A connection may go from box 159 to a wireless encrypted dongle 161, with ECC 508. An HTTPS, FOXs connection may go from wireless encrypted router 149 to wireless encrypted dongle 161.

A BACnet MSTP bus connection may go from driver 137 to a BACnet controller process module 162 in portion 195 of FIG. 18E. A BACnet MSTP to JACE connection may go from module 162 to JACE 156.

A connection HTTPS may go from a sentinence 146 of cloud 144 to a view point history module 163 (e.g., of light commercial building solutions (LCBS) web client UI) in portion 191 of FIG. 18A. An HTTPS connection may go from a contractor user management web I/F SF.COM module 165 of a cloud 164 to module 163. An HTTPS connection may go from mechanism 154 to module 163. An HTTPS connection may go from module 163 to a web browser interface 167 of a module 166. A remote HVAC user device 168 may have a UI connection to web browser 167 and a UI connection to a Niagara workbench 169 of module 166. An HTTPS connection may go from web browser interface 167 to mechanism 154. An HTTPS connection may go from Niagara workbench 169 to a Niagara license server 171. A FOX Secure connection may go from workbench 169 to mechanism 154. A compass 172 may have a BACnet/IP connection to mechanism 154.

Sylk driver 139 may have a Sylk bus connection to Sylk devices 173, such as, for example, modules C7400S, TR75H, TR42, and actuators. Microset driver 138 may have an all in one (AIO) microset connection to a microset 174 set of devices.

To recap, a control system may incorporate an off-premise internet cloud and tool subsystem, an on-premise networking infrastructure and control subsystem, an internet protocol controller subsystem, an external bus device subsystem, and an input/output (TO) device subsystem. The internet protocol controller subsystem may relate to or be a specialty apparatus for one or more buildings such as, for example, a heating, ventilation, and air conditioning (HVAC) controller.

The external bus device subsystem may incorporate a local IO device communication subsystem.

The IO device subsystem may incorporate expansion IO devices and physical IO devices.

The off-premise internet cloud and tool subsystem may incorporate a Niagara™ license server connected to a Niagara workbench, a web browser interface connected to a firewall or security or virtual private network (VPN) or open module, and a remote HVAC user mechanism for operating the web browser interface or the Niagara workbench.

The on-premise networking infrastructure and control subsystem may incorporate a firewall or security or VPN or open module having a secure connection to a Niagara workbench, and a wireless encrypted router connected to the firewall or security or VPN or open module and connected to a wireless encrypted dongle, and a BACnet internet protocol (IP) controller connected to the firewall or security or VPN or open module.

The internal protocol controller subsystem may incorporate a remote communication VPN connector connected to a Niagara workbench online/offline, the firewall or security or VPN or open module, a factory and a Java™ application control engine (JACE™), a firmware (FW) updated service, a memory, and a multi or four port switch manager. The multi or four port switch manager may be connected to the JACE, a BACnet IP controller, an F1 IP controller, and/or a similar or equivalent controller, and the factory may be connected to a public key infrastructure (PKI) certificate service.

An approach for constructing a secure control system, may incorporate interconnecting an off-premise internet cloud and tool subsystem across an internet boundary with an on-premise networking infrastructure and control subsystem via one or more secure and non-secure connections, interconnecting the on-premise networking infrastructure and control subsystem with an internet protocol controller subsystem via one or more secure and non-secure connections, interconnecting the internet protocol controller subsystem with an external bus device subsystem via one or more secure and non-secure connections, and interconnecting the external bus device subsystem with an IO device subsystem.

The internet protocol controller subsystem may incorporate a direct digital control module connected to a web server and a processing platform. The web server may be connected to a remote communication virtual private network (VPN) connector and a first serial communication manager module.

The first serial communication manager module may be connected to a second serial communication manager via a secure connection.

The remote communication VPN connector may be connected to components of the on-premise networking infrastructure and control subsystem.

The remote communication VPN connector may be connected to a multi or four port switch manager of the internet protocol controller subsystem, and a firmware (FW) update service and a memory.

The four port switch may be connected via one or more secure and non-secure connections to a Java™ application control engine (JACE) module and to one or more internet protocol controller subsystem of the on-premise networking infrastructure and control subsystem.

At least one of the one or more internet protocol controller subsystems may be connected to a firewall or security or VPN or open module. The firewall or security or VPN or open module may be connected via one or more secure and non-secure connections to a cloud of the off-premise internet cloud and tool subsystem.

An apparatus for a secure direct digital control and integration control platform may incorporate an internet protocol controller subsystem having a direct digital control module, a web server, and a workstation platform operating subsystem interconnected with one another. The web server may be connected to a remote communication virtual private network (VPN) connector and to a first serial communication manager that is connected to an encrypted file system and has a secure connection to a second serial communication manager.

The apparatus may further incorporate an on-premise networking infrastructure and control subsystem having an online/offline workbench, a firewall or security or VPN or open module, a factory module and a Java™ application control engine (JACE) module connected via a secure or non-secure line to the remote communication VPN connector of the internet protocol controller subsystem.

The apparatus may further incorporate an off-premise internet cloud and tool subsystem having a cloud, a workbench and a web browser interface connected to the firewall or security or VPN or open module of the on-premise networking infrastructure and control subsystem. A remote heating, ventilation and air conditioning (HVAC) user interface may be connected to the web browser interface and the workbench.

The remote communication VPN connector of the internet protocol controller subsystem may be connected to a one Gbps or more multi-port switch manager module having a rapid spanning tree protocol (RSTP) block. The multi-port switch management may be connected to the JACE module via one or more of secure and non-secure connections.

The multi-port switch management module may be connected to at least one internet protocol controller of the on-premise networking infrastructure and control subsystem.

The internet protocol controller subsystem may have an input/output (TO) driver connected to an encrypted file subsystem and an open real-time operating system (RTOS) secure boot. The second serial communication manager may be connected to the encrypted file subsystem and the open RTOS secure boot. The open RTOS secure boot may be connected to a polarization-insensitive driver and which is connected to a polarization-insensitive bus for connection to one or more sensor devices and actuator devices. The encrypted file subsystem may be connected to one more drivers. The IO driver may be connected to one or more IO expansion modules and one or more physical IO modules.

Figure 19:
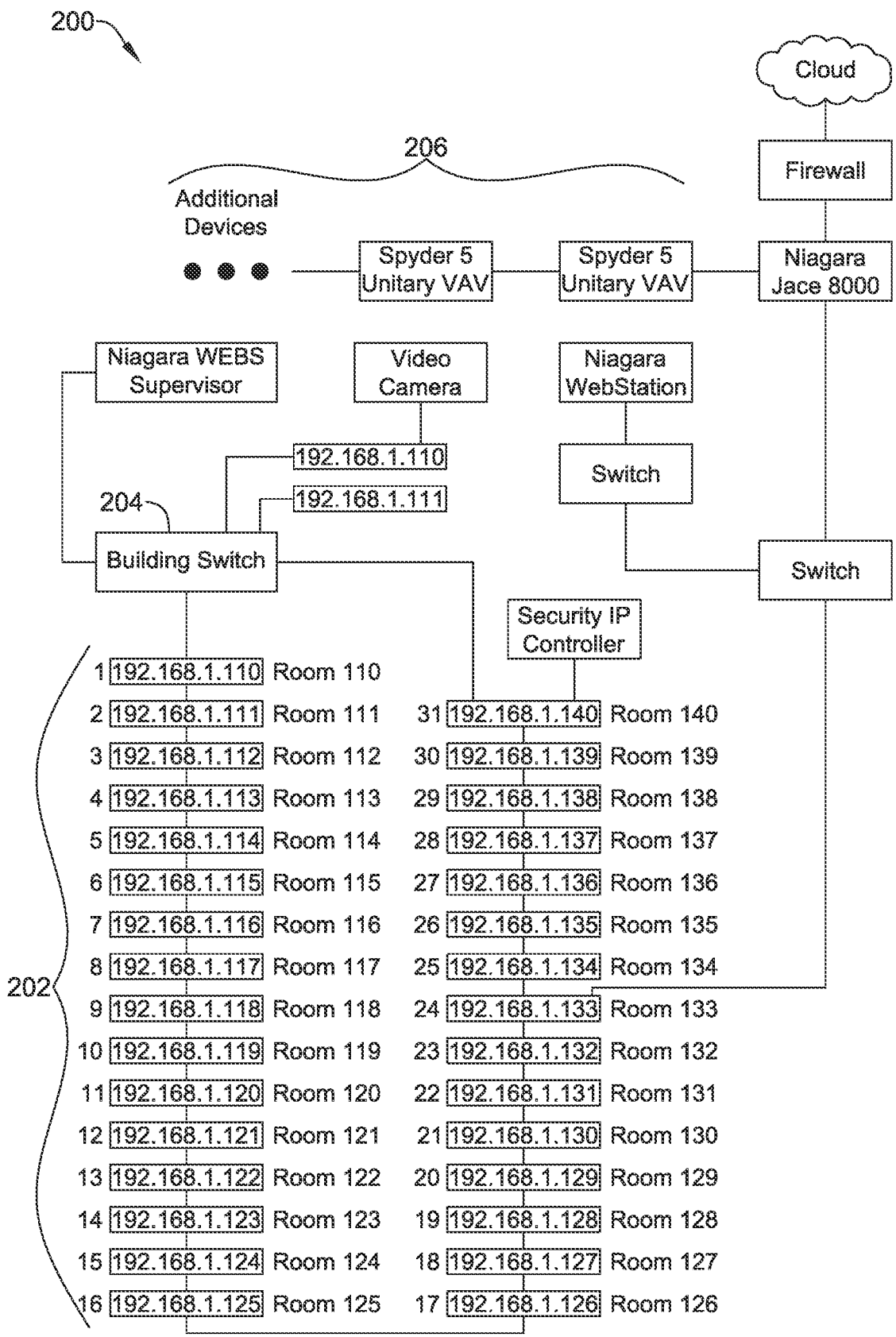
FIG. 19 is a schematic block diagram of a building automation system including a plurality of building controllers.

FIG. 19 is a schematic block diagram of an illustrative building automation system 200 that includes an RSTP loop 202. The RSTP loop 202 can include many (e.g. forty or more) building controllers such as CIPer30/F1 controllers and as illustrated includes a total of 31 building controllers distributed between a Building A and a Building B. Each of these building controllers may be considered as representing any of the building controllers 14, 18, 54, 66 discussed with respect to FIGS. 1, 2, 5 and 6 or any of the HVAC controllers 32, 44 discussed with respect to FIGS. 3 and 4. Each of the building controllers included within the RSTP loop 202 has the RSTP functionality built into the building controller. Each of the building controllers also include a managed switch such as the managed network switch 26, the managed multi-port network switch 36, the managed network switch 60 or the managed switch 70. The building automation system 200 includes a building switch 204.

It can be seen that the port 1 of a building switch 204 is coupled to the port 1 of a building controller labeled as being in "Room 110" of Building A and having an IP address of 192.168.1.110. Port 2 of that building controller is coupled to the port 1 of the building controller labeled as being in "Room 111" of Building A and having an IP address of 192.168.1.111. This continues through the building controllers labeled as being in "Room 112" through "Room 127" of Building A and the building controllers labeled as being in "Room 128" through "Room 140" of Building B. Port 2 of the building controller labeled as being in "Room 140" and having an IP address of 192.168.1.140 is coupled to the port 3 of the building switch 204. It will be appreciated that these building controllers form an RSTP loop in which information can pass between the building controllers in either a forward direction ("Room 110" to "Room 111" and so on) or in a backward direction ("Room 140" to "Room 139" and so on). As a result, if the RSTP loop 202 is otherwise broken by, for example, an unpowered or malfunctioning building controller within the RSTP loop 202, information that would normally flow in a forward direction from building controller to building controller can if necessary be back-fed in the opposite direction, in order to reach the building controllers that would be considered to be downstream of the unpowered building controller.

The building automation system 200 also includes several building controllers, labeled as having addresses 192.168.1.150 and 192.168.1.151 that are outside of the RSTP loop 202. The building automation system 200 also includes BACnet devices such as the Spyder devices generally labeled as 206. It will be appreciated that the RSTP loop 202 can be used as part of a substantial and powerful building automation system such as the building automation system 200.

U.S. Pat. No. 10,200,203, issued Feb. 5, 2019; U.S. Pat. No. 8,375,402, issued Feb. 12, 2013; U.S. Pat. No. 9,726,392, issued Aug. 8, 2017; U.S. Pat. No. 8,983,632, issued Mar. 17, 2015; U.S. Pat. No. 8,954,543, issued Feb. 10, 2015; U.S. Pat. No. 8,650,306, issued Feb. 11, 2014; U.S. Pat. No. 8,418,128, issued Apr. 9, 2013; U.S. Pat. No. 8,239,500, issued Aug. 7, 2012; U.S. Pat. No. 8,112,162, issued Feb. 7, 2012; U.S. Pat. No. 7,826,929, issued Nov. 2, 2010; U.S. Pat. No. 7,738,972, issued Jun. 15, 2010; and U.S. Pat. No. 7,653,459, issued Jan. 26, 2010; are all hereby incorporated by reference. U.S. patent application Ser. No. 16/436,859, filed Jun. 10, 2019, and U.S. patent application Ser. No. 16/892,934, filed Jun. 4, 2020, are hereby incorporated by reference.

Any publication or patent document noted herein is hereby incorporated by reference to the same extent as if each publication or patent document was specifically and individually indicated to be incorporated by reference.

Additional Examples

Example 1. A building controller configured to control one or more building system components of a building control system, the building controller comprising:
  a housing;
  one or more wiring terminals accessible from outside of the housing;
  a controller housed by the housing and operatively coupled to the one or more wiring terminals, the controller configured to output one or more control commands on one or more of the wiring terminals, wherein at least one of the one or more control commands is configured to control one or more building control components; and
  a managed network switch housed by the housing, the managed network switch including a plurality of network switch ports that are each accessible from outside of the housing and configured to be releasably secured to one or more network cables, the building controller is configured to receive user input for configuring one or more managed characteristics of the managed network switch.

Example 2. The building controller of Example 1, wherein the controller is configured to control at least part of the managed network switch.

Example 3. The building controller of Example 1, further comprising a network switch controller, separate from the controller, for controlling at least part of the managed network switch, wherein the controller and the network switch controller communicate with each other.

Example 4. The building controller of Example 1, wherein the building controller is configured to perform diagnostics on one or more of the plurality of network switch ports, resulting in diagnostic information.

Example 5. The building controller of Example 4, wherein the diagnostic information includes one or more identified faults in one or more network cables secured to one or more of the plurality of network switch ports.

Example 6. The building controller of Example 4, wherein the controller is configured to execute a control algorithm to generate the one or more control commands, wherein the control algorithm is at least partially dependent on the diagnostic information.

Example 7. The building controller of Example 1, wherein the controller is configured to accept information received by one or more of the plurality of network switch ports.

Example 8. The building controller of Example 1, wherein the controller is configured to accept user input from one or more of the plurality of network switch ports for configuring one or more managed characteristics of the managed network switch.

Example 9. The building controller of Example 1, wherein one or more managed characteristics of the managed network switch comprises a Media Access Control (MAC) filtering characteristic.

Example 10. The building controller of Example 1, wherein one or more managed characteristics of the managed network switch comprises activation and/or deactivation of one or more of the plurality of network switch ports of the managed network switch.

Example 11. The building controller of Example 1, wherein the building controller is configured to determine a connection status of at least one of the plurality of network switch ports of the managed network switch.

Example 12. The building controller of Example 1, wherein the building controller is configured to determine a connection speed of at least one of the plurality of network switch ports of the managed network switch.

Example 13. The building controller of Example 1, wherein one or more managed characteristics of the managed network switch comprises activation of a Rapid Spanning Tree Protocol (RSTP) loop management algorithm for the managed network switch.

Example 14. The building controller of Example 1, wherein one or more managed characteristics of the managed network switch comprises activation of a Virtual Local Area Network (VLAN) that provides a virtual network in which data transmitted over the virtual network by the managed network switch is logically isolated.

Example 15. The building controller of Example 1, wherein the building controller is configured to encrypt at least some data that is received by one or more of the plurality of network switch ports.

Example 16. The building controller of Example 1, wherein the controller comprises a function block engine that executes one or more function blocks that generate the one or more control commands.

Example 17. The building controller of Example 16, wherein the function block engine execute one or more function blocks that implement at least part of the managed network switch.

Example 18. The building controller of Example 17, wherein the function block engine executes one or more function blocks that receive user input for configuring one or more managed characteristics of the managed network switch.

Example 19. The building controller of Example 16, wherein the function block engine comprises a Niagara™ function block engine.

Example 20. A Heating, Ventilating and Air Conditioning (HVAC) controller that is configured to control operation of at least part of an HVAC system, the HVAC controller comprising:
- a housing configured to be secured to a mounting surface;
- a managed multi-port network switch carried by the housing, the managed multi-port network switch including a plurality of network ports; and
- a controller disposed within the housing and operably coupled with the managed multi-port network switch, the controller outputting one or more control commands to control operation of at least part of the HVAC system.

Example 21. The HVAC controller of Example 20, further comprising:
- one or more input terminals secured relative to the housing and configured to be wired to an HVAC system sensor, each of the one or more input terminals being operably coupled with the controller; and
- one or more output terminals secured relative to the housing and configured to be wired to an HVAC system component, each of the one or more output terminals operably coupled with the controller such that the controller outputs the one or more control commands via the one or more output terminals.

Example 22. The HVAC controller of Example 21, further comprising a plurality of manually-actuated HAND-OFF-AUTO (HOA) switches carried by the housing each having a HAND (H) position, an OFF (O) position and an AUTO (A) position, each of the plurality of HOA switches associated with a corresponding output of the one or more output terminals and operatively coupled to the controller.

Example 23. The HVAC controller of Example 20, further comprising a user interface port for interfacing with the HVAC controller, wherein the user interface port is configured to receive user input to configure the managed multi-port network switch.

Example 24. The HVAC controller of Example 20, further comprising a user interface port for interfacing with the HVAC controller, wherein the user interface port is configured to receive user input to disable one or more of the plurality of network ports that is not being used.

Example 25. The HVAC controller of Example 20, further comprising a user interface port for interfacing with the HVAC controller, wherein the user interface port is configured to receive user input to restrict one or more of the plurality of network ports to one or more specified MAC addresses.

Example 26. The HVAC controller of Example 20, further comprising a user interface port for interfacing with the HVAC controller, wherein the user interface port is configured to receive user input to make a Quality of Service (QoS) selection for traffic prioritization.

Example 27. The HVAC controller of Example 26, wherein the user interface port is configured to provide information to a user regarding the managed multi-port network switch.

Example 28. The HVAC controller of Example 26, wherein the user interface port is configured to provide information to a user regarding the managed multi-port network switch, wherein the information includes a connection status and/or connection speed of one or more of the plurality of network ports of the managed multi-port network switch.

Example 29. The HVAC controller of Example 26, wherein the user interface port is configured to provide information to a user regarding the managed multi-port network switch, wherein the information includes diagnostic information for one or more of the plurality of network ports of the managed multi-port network switch.

Example 30. A building controller configured to control one or more building system components of a building control system, the building controller comprising:
- a housing;
- a controller housed by the housing, the controller configured to output one or more control commands to control one or more building control components; and
- a managed network switch housed by the housing, the managed network switch including a plurality of network switch ports that are each accessible from outside of the housing and configured to be releasably secured to one or more network cables, the building controller is configured to receive user input for configuring one or more managed characteristics of the managed network switch.

Example 31. The building controller of Example 30, wherein the building controller comprises a wireless interface for receiving from a remote device user input for configuring one or more managed characteristics of the managed network switch.

Example 32. The building controller of Example 30, wherein the building controller comprises a wired interface for receiving from a remote device user input for configuring one or more managed characteristics of the managed network switch.

Example 33. The building controller of Example 32, wherein the wired interface comprises one or more of the plurality of network switch ports.

Example 34. The building controller of Example 30, wherein the building controller comprises a wireless interface for outputting the one or more control commands to control one or more building control components of a building control system.

Example 35. The building controller of Example 30, wherein the building controller comprises a wired interface for outputting the one or more control commands to control one or more building control components of a building control system.

Example 36. The building controller of Example 35, wherein the wired interface comprises one or more wiring contacts accessible from outside of the housing.

Example 37. The building controller of Example 35, wherein the wired interface comprises one or more of the plurality of network switch ports.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A building controller configured to control one or more building system components of a building control system, the building controller comprising:
- a mountable housing configured to be mounted to a mounting surface;
- one or more wiring terminals accessible from outside of the housing such that a user can secure one or more wires from one or more of the building system components to respective ones of the one or more wiring terminals;
- a controller housed by the housing and operatively coupled to the one or more wiring terminals, the controller configured to output one or more control signals on one or more of the wiring terminals, wherein at least one of the one or more control commands is configured to control one or more building control components;

a managed multi-port network switch housed by the housing, the managed multi-port network switch including a plurality of network switch ports that are each accessible from outside of the housing, are each separate from the one or more wiring terminals of the building controller, and are each configured to be releasably secured to one or more network cables, wherein each of the plurality of network switch ports of the managed multi-port network switch can communicate at a rate of at least 10 megabits per second (MB/s) over a corresponding network cable and can provide network communication between two remote devices when each of the remote devices is coupled to a respective one of the plurality of network switch ports; and the building controller is configured to receive user input for configuring each of one or more of a plurality of managed network port settings for each of the plurality of network switch ports of the managed multi-port network switch, and in response, configure each of the one or more of the plurality of managed network port settings for each of the plurality of network switch ports of the managed multi-port network switch based on the received user input.

2. The building controller of claim 1, wherein the controller is configured to control at least part of the managed multi-port network switch.

3. The building controller of claim 1, further comprising a network switch controller, separate from the controller, for controlling at least part of the managed multi-port network switch, wherein the controller and the network switch controller communicate with each other.

4. The building controller of claim 1, wherein the building controller is configured to perform diagnostics on one or more of the plurality of network switch ports, resulting in diagnostic information.

5. The building controller of claim 4, wherein the controller is configured to execute a control algorithm to generate the one or more control signals and provide the one or more control signals to one or more of the wiring terminals to control one or more building system components of a building control system, wherein the one or more control signals generated by the control algorithm are is at least partially dependent on the diagnostic information.

6. The building controller of claim 1, wherein the building controller is configured to:
   accept information received by one or more of the plurality of network switch ports; and
   encrypt at least some data that is send and/or received by one or more of the plurality of network switch ports.

7. The building controller of claim 1, wherein the building controller is configured to determine:
   a connection status of at least one of the plurality of network switch ports of the managed multi-port network switch with a corresponding network cable; and
   a connection speed of at least one of the plurality of network switch ports of the managed multi-port network switch.

8. The building controller of claim 1, wherein the controller comprises a function block engine that executes:
   one or more function blocks that generate the one or more control signals that are provide to one or more of the wiring terminals to control one or more building system components of a building control system; and
   one or more function blocks that implement at least part of the managed multi-port network switch.

9. The building controller of claim 8, wherein the function block engine executes one or more function blocks that receive user input for configuring each of one or more of the plurality of managed network port settings for each of the plurality of network switch ports of the managed multi-port network switch.

10. The building controller of claim 8, wherein the function block engine comprises a Niagara™ function block engine.

11. A Heating, Ventilating and Air Conditioning (HVAC) controller that is configured to control operation of at least part of an HVAC system, the HVAC controller comprising:
    a housing configured to be secured to a mounting surface;
    a plurality of wiring terminals accessible from outside of the housing such that one or more wires from one or more HVAC components of the HVAC system can be connected to respective ones of the plurality of wiring terminals;
    a managed multi-port network switch carried by the housing, the managed multi-port network switch including a plurality of network ports each configured to be releasably secured to a network cable, wherein each of the plurality of network switch ports can communicate at a rate of at least 10 megabits per second (MB/s) over a corresponding network cable, and wherein the managed multi-port network switch can provide network communication between two or more remote devices;
    a controller disposed within the housing and operably coupled with the plurality of wiring terminals and the managed multi-port network switch, the controller configured to execute a control algorithm to generate one or more control signals, and the controller configured to output the one or more control signals to one or more of the plurality of wiring terminals to control operation of one or more HVAC components of the HVAC system; and
    the controller is configured to receive user input for configuring each of one or more of a plurality of managed network port settings for each of the plurality of network ports of the managed multi-port network switch, and in response, configure each of the one or more of the plurality of managed network port settings for each of the plurality of network switch ports of the managed multi-port network switch based on the received user input, wherein the plurality of managed network port settings for each of the plurality of network ports of the managed multi-port network switch include one or more of:
       a disable/enable setting for enabling and disabling the corresponding one of the plurality of network ports;
       a speed setting for setting the speed of the corresponding one of the plurality of network ports;
       one or more RSTP configuration settings for the corresponding one of the plurality of network ports;
       a filter setting for restrict the corresponding one of the plurality of network ports to one or more specified MAC addresses; and
       a Quality of Service (QOS) setting for traffic prioritization.

12. The HVAC controller of claim 11, further comprising a plurality of manually-actuated HAND-OFF-AUTO (HOA) switches carried by the housing each having a HAND (H) position, an OFF (O) position and an AUTO (A) position, each of the plurality of HOA switches associated with a corresponding output of the plurality of wiring terminals and operatively coupled to the controller.

13. The HVAC controller of claim 11, where the controller is configured to output
information regarding the managed multi-port network switch, wherein the information includes one or more of:
a connection status and/or connection speed of one or more of the plurality of network ports of the managed multi-port network switch; and
diagnostic information for one or more of the plurality of network ports of the managed multi-port network switch.

14. A building controller configured to control one or more building system components of a building control system, the building controller comprising:
a wall mountable housing;
a plurality of wiring terminals accessible from outside of the wall mountable housing such that one or more wires from one or more building system components of the building control system can be connected to respective ones of the plurality of wiring terminals;
a controller housed by the wall mountable housing, the controller operatively coupled to the plurality of wiring terminals and configured to output one or more control signals to one or more of the plurality of wiring terminals to control one or more building control components;
a managed multi-port network switch housed by the wall mountable housing, the managed multi-port network switch including a plurality of network switch ports that are each accessible from outside of the wall mountable housing and configured to be releasably secured to one or more network cables, wherein each of the plurality of network switch ports of the managed multi-port network switch can communicate at a rate of at least 10 megabits per second (MB/s) over a corresponding network cable, and wherein the managed multi-port network switch can provide network communication between two remote devices when each of the remote devices is coupled to a respective one of the plurality of network switch ports; and
the building controller is configured to receive user input for configuring each of one or more of a plurality of managed network port settings for each of the plurality of network switch ports of the managed multi-port network switch, and in response, configure each of the one or more of the plurality of managed network port settings for each of the plurality of network switch ports of the managed multi-port network switch based on the received user input.

15. The building controller of claim 14, wherein the building controller comprises a wireless interface for receiving from a wireless device user input for configuring one or more managed characteristics of the managed multi-port network switch.

16. The building controller of claim 14, wherein the building controller comprises a wired interface for receiving from a user device user input for configuring one or more managed characteristics of the managed multi-port network switch.

* * * * *